July 24, 1962 H. U. GARRETT ET AL 3,045,759

WELL APPARATUS

Filed Jan. 26, 1955 12 Sheets-Sheet 1

HENRY U. GARRETT
CLIFFORD M. PETERS INVENTORS.
ROBERT W. DINNING

July 24, 1962 H. U. GARRETT ET AL 3,045,759

WELL APPARATUS

Filed Jan. 26, 1955 12 Sheets-Sheet 2

HENRY U. GARRETT
CLIFFORD M. PETERS
ROBERT W. DINNING
INVENTORS.

July 24, 1962 H. U. GARRETT ET AL 3,045,759

WELL APPARATUS

Filed Jan. 26, 1955 12 Sheets-Sheet 3

HENRY U. GARRETT
CLIFFORD M. PETERS
ROBERT W. DINNING
INVENTORS.

HENRY U. GARRETT
CLIFFORD M. PETERS INVENTORS.
ROBERT W. DINNING

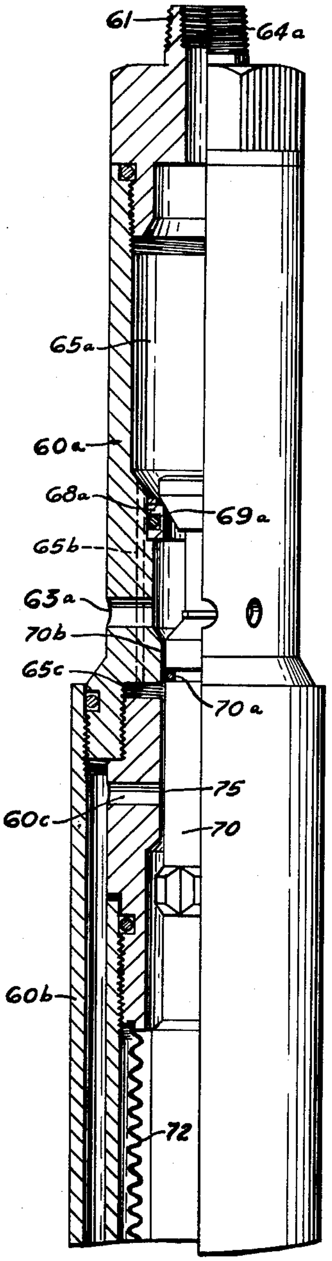
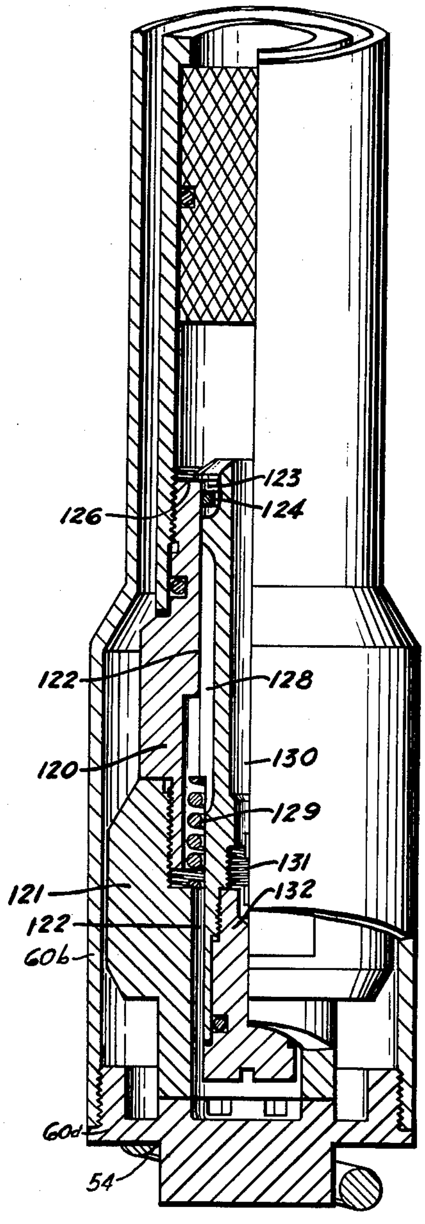
Fig. 6B.
Fig. 6A.
HENRY U. GARRETT
CLIFFORD M. PETERS
ROBERT W. DINNING
INVENTORS.

HENRY U. GARRETT
CLIFFORD M. PETERS
ROBERT W. DINNING
INVENTORS.

HENRY U. GARRETT
CLIFFORD M. PETERS INVENTORS.
ROBERT W. DINNING

July 24, 1962 H. U. GARRETT ET AL 3,045,759

WELL APPARATUS

Filed Jan. 26, 1955 12 Sheets-Sheet 8

HENRY U. GARRETT
CLIFFORD M. PETERS
ROBERT W. DINNING
INVENTORS.

July 24, 1962 H. U. GARRETT ET AL 3,045,759

WELL APPARATUS

Filed Jan. 26, 1955 12 Sheets-Sheet 9

HENRY U. GARRETT
CLIFFORD M. PETERS
ROBERT W. DINNING
INVENTORS.

HENRY U. GARRETT
CLIFFORD M. PETERS INVENTORS.
ROBERT W. DINNING

HENRY U. GARRETT
CLIFFORD M. PETERS
ROBERT W. DINNING
INVENTORS.

July 24, 1962 H. U. GARRETT ET AL 3,045,759

WELL APPARATUS

Filed Jan. 26, 1955 12 Sheets-Sheet 12

HENRY U. GARRETT INVENTORS.
CLIFFORD M. PETERS
ROBERT W. DINNING

United States Patent Office 3,045,759
Patented July 24, 1962

3,045,759
WELL APPARATUS

Henry U. Garrett and Clifford M. Peters, Longview, and Robert W. Dinning, Kilgore, Tex., assignors, by mesne assignments, to Udell, Inc., Longview, Tex., a corporation of Texas Filed Jan. 26, 1955, Ser. No. 484,164
16 Claims. (Cl. 166—224)

This invention relates to apparatus employed in controlling flow of fluid into or out of a conduit in a well. In one of its aspects, it relates to a system and improved apparatus adapted to be employed in such a system for regulating the production of fluid from an earthen formation so as to maintain and control the pressure maintained on the formation. In another aspect, the invention relates to improved apparatus particularly useful in producing a well by gas lifting techniques and to improved apparatus for completing and producing wells.

In many petroleum producing wells, it is desired to control flow of fluid produced from a formation into the production conduit or tubing string so as to maintain a substantial back pressure on the formation while fluid is being produced from the same. There are several reasons for such desire, any one or all of which may be existent with respect to any given well. Thus, the maintenance of a production flow rate to be such as to yield a substantially constant back pressure on the formation has been found to limit the gas-to-oil ratio of the production from the well. It also prevents "coning" of water from a lower water-bearing zone into the oil sands and into the bore hole. By maintaining at least a minimum back pressure on the formation, the "sand-face" differential (i.e. the pressure drop between a point in the formation and a point in the bore hole) does not become great enough that water underlying the producing sands will be lifted up sufficiently from its normal level so as to flow into the well. Still another reason may lie in the fact that some wells cannot be produced at their maximum rate without injury to the productivity of the well. For example, a high pressure well may not be capable of successfully producing at a maximum sand-face differential such as would exist if flow from the formation was substantially unrestricted. In fact, permitting such maximum differential to be applied to some wells will ruin them. Accordingly, it is necessary to maintain a back pressure on the formation at all times. It would therefore be desirable, for these and other reasons known to those skilled in the art, to maintain the back pressure on the formation to be as high as possible consistent with the volume of fluid to be produced.

Heretofore, it has been one practice to locate a choke, which is a structure containing a small fixed-size orifice, in the tubing to limit flow from the formation thereinto. While such a choke will tend to so limit the flow and thereby maintain a back pressure on the formation, it has the disadvantage of being fixed in size so that once it is situated in the well, it is not possible to change the size thereof short of pulling the tubing or otherwise removing the choke from the well. Also, the back pressure it maintains fluctuates with flow rates, tubing pressure, formation pressure, the physical characteristics of the formation fluid and other factors. Accordingly, variations in these factors, changes in the gas-to-oil ratio, and other fluctuations dictating a change in back pressure to be maintained on the formation cannot be readily accommodated.

Bottom hole pressure regulators have also been suggested for regulating the flow of a formation fluid into a tubing. Such regulators operate by maintaining a predetermined differential across themselves so that by adjusting the pressure maintained on the tubing at the well head, the back pressure maintained on the formation can also be adjusted. However, with such regulators, there is the disadvantage of not being able to adjust the differential they maintain across themselves while situated in the well and, more important, adjustment of the tubing pressure at the well head to supposedly fix a selected back pressure on the formation involves several disadvantages. One is that it presupposes a knowledge of the pressure exerted on the regulator by the head of fluid in the tubing and that such head will be substantially constant. Since such knowledge cannot be ascertained with any degree of certainty, particularly under practical field operations and since the head will fluctuate in many wells, the maintenance or application of a selected back pressure on a formation with any degree of accuracy is not only well nigh impossible to attain but frequently cannot be attained at all. Also, failure of surface choke or other equipment so that they no longer maintain the desired tubing pressure at the well head will cause the back pressure on the formation to drop. In such event, the flow from the well will be increased since the regulator will open to accommodate the volume of flow necessary to yield the pressure differential for which the regulator is set.

It is accordingly an object of this invention to provide a system for regulating the flow of fluid from a producing formation of a well into a flow conduit in the well to maintain a selected back pressure on the formation, the flow regulation being controlled by and responsive to pressure of fluid flowing from the formation so that an accurate and reliable control of back pressure on the formation is obtained despite fluctuations in well conditions.

Another object is to provide such a system in which a pressure responsive valve means is employed to control flow from the formation into a well conduit, the valve means being opened and closed in response to variations in pressure of fluid flowing from the formation upstream of the valve means so that when such pressure rises or falls to be above or below a predetermined amount, the valve means is respectively opened and closed substantially irrespective of pressure of fluid downstream of the valve means or of the flow rate through the valve means.

Another object is to provide such a system in which the back pressure to be maintained on the formation can be regulated from the surface of the earth without withdrawing a flow regulating means from the well.

Another object is to provide such a system in which the back pressure maintained on the formation by the valve means can be selected by operation of an instrumentality controlled from the earth's surface, such as by manipulating the pressure in a tubing or casing or both or by a wire line operation, thereby permitting periodically changing the back pressure to be maintained on the formation to be at a value consistent with the then desired volume of production from the well or with other factors, such as the gas-to-oil ratio, determined by such back pressure, all without removing the valve means from the well.

Another object is to provide a system for producing a well in which flow of fluid from a producing formation is controlled by the pressure of such fluid to maintain a selected back pressure on the formation and in which the pressure of such fluid is also employed to change the value of the back pressure to be so maintained.

Another object is to provide such a system in which a valve for controlling flow of fluid from the formation into a well conduit can be landed in or removed from its operating position in a well by a wire line operation, the arrangement being such that pressure of formation fluid controls opening and closing of the valve in operation and also can be employed to periodically and selectively adjust the operating characteristics of such valve to thereby determine the magnitude of the pressure of the formation fluid required to control opening and closing of the valve in operation.

Another object is to provide such a system having a valve arrangement as aforesaid and also having a packer or sealing means in the conduit-well bore annulus confining the formation fluid to the lower portion of such annulus, means also being provided for variably controlling from the earth's surface the pressure of formation fluid in such lower annulus portion in order to thereby permit selection of the charge pressure of a valve from a wide range of pressures.

It is another object of this invention to provide an apparatus and system in which valve means are provided to regulate fluid flow through a well conduit to yield a substantially constant pressure downstream thereof, irrespective of pressure fluctuations upstream of the valve means whereby fluid can be delivered to the earth's surface at a preselected pressure independently of bottom hole pressure.

Another object is to provide a system for maintaining a selected back pressure on a producing formation substantially independently of conditions existing in a production tubing and for regulating the flow of production fluids through the tubing to decrease their pressure therein and to deliver them to the surface of the earth at a preselected pressure substantially independently of bottom hole pressure.

Another object is to provide such a system wherein the valve means controlling flow through the tubing are adapted to have their operating characteristics changed while disposed in the well whereby the pressure downstream thereof can be changed as desired.

In accordance with one feature of the system to which this invention pertains as above indicated and as will be more fully described hereinafter, the force required to be exerted by a control pressure to operate a pressure responsive valve is changed while the valve remains in the well by an instrumentality manipulated from the earth's surface. For example, the concept of the system of this invention includes the use of a valve of the pressure charged type to control fluid flow from a producing formation into a tubing and varying the pressure charge in the valve while it is in the well to adjust the force exerted by the charge in urging the valve toward closed position in opposition to the force exerted by a control (i.e. formation) fluid urging the valve toward open position. By thus varying the charge pressure, the pressure of the control fluid necessary to open a valve is likewise varied. While valves capable of having their operating characteristics changed in this or other manners can be employed in accordance with the above noted feature of the system of this invention, there is provided new and improved valves for use in such system and also for use in accordance with gas lifting and other techniques employed in producing wells.

Thus gas lifting of a well usually involves an installation of a plurality of dumping valves and one or more working valves spaced along a well conduit or tubing to control flow of a lifting fluid between such conduit and another conduit. These valves are usually of the type employing a resilient means, such as a pressure charge, urging the valves toward closed position against the force of a control fluid, which may be either casing or tubing fluid, urging the valves toward open position. The operating characteristics of such type valves thus are at least in part determined by the magnitude of the resilient means or charge pressure. It would be highly desirable to possess a valve which can have the magnitude of its resilient means or charge pressure accurately changed while the valve remains in the well with such a change being under positive control from the earth's surface and accomplished in an improved manner. Such valve could be useful not only in gas lifting a well but also in the system of this invention and in other well operations.

It is therefore an object of this invention to provide an improved pressure responsive valve wherein the effective force exerted by a resilient means urging the valve toward one of its open and closed positions can be selectively changed under the control of a tool insertable through a conduit in a well and manipulatable therein from the earth's surface so that the initiation and prevention of any such change is positively controllable from the earth's surface independently of well pressures whereby the latter can be varied over a wide range without effecting an undesirable change in the force exerted by the resilient means.

Another object is to provide such a valve which when installed on a well conduit in a well can have the pressure of the fluid exteriorly of the well conduit applied to change the force of the resilient means by a wire line manipulation occurring in the conduit controlling such application of pressure exterior of the conduit.

Another object is to provide an improved pressure responsive valve means of the pressure charged type adaptable not only for use in such system but also for other uses in a well such as gas lifting in which the pressure charge can be adjusted by manipulating a tool into the well without removing the valve from the well to cause the application of pressure exterior of the valve means to that of the charge to raise and lower the latter whereby the application of such exterior pressure can be positively controlled independently of the magnitude or fluctuations in magnitude of the exterior pressure.

Another object is to provide a pressure responsive valve of the pressure charged type wherein the magnitude of the pressure charge can be changed while the valve is in the well through manipulation of well pressures to open and close pressure responsive valve means controlling flow of fluid through a port into and out of the charge chamber of the valve to thereby vary the pressure in such chamber, the arrangement of the pressure responsive valve means being such that they respond to the difference in pressure between that in the charge chamber and that of a control fluid substantially independently of flow through said port whereby any change in charge pressure can be very closely controlled.

Another object is to provide such a valve in which the fluid in a charge chamber acts as a charge pressure not only in controlling opening and closing of the valve itself, but also in opening and closing valve means for changing the magnitude of such charge pressure.

Another object is to provide a reservoir means for a pressure charge valve wherein the reservoir means supplies fluid to and accepts fluid from the charge chamber of the valve under the influence of pressure of well fluid applied to fluid in the reservoir so as to limit flow of well fluids into the charge chamber, the arrangement being such that the reservoir means can be pre-charged and then inserted in a well to be opened therein to the influence of well fluid pressure.

Another object is to provide a mechanism for controlling opening and closing of a chamber in a well tool and arranged so that such chamber can be charged with fluid under pressure and then lowered into a well, the chamber remaining closed until the well pressure acting on such mechanism increases to a predetermined value sufficient to cause it to open the chamber after which the chamber remains open even though the well pressure may substantially increase or decrease.

Another object is to provide such a chamber and mechanism in combination with a pressure charged valve adapted to have its charge pressure changed by application of pressure from said chamber thereto under the influence of well fluid pressures and wherein the chamber can be pressurized at the surface of the earth with a fluid at an elevated pressure and then the valve, mechanism and chamber lowered into a well where the well fluid pressure can cause the mechanism to open the chamber so that fluid pressure can act through the chamber to change the valve's charge pressure, the chamber acting as a reservoir to supply fluid to and receive fluid from the charged valve so that well fluids need not enter the valve, at least in excessive quantities.

Another object is to provide a mandrel with which a pressure responsive valve can be incorporated for controlling flow into or out of a conduit in a well, the mandrel providing means controlling flow of fluid from one point at its exterior to the interior of a charge chamber of the valve incorporated with the mandrel, the control being effected by an instrumentality controlled from the earth's surface and acting through the conduit and interior of the mandrel to control said flow exteriorly of the mandrel.

Another object is to provide a mandrel having valve means controlling flow through a passage connecting two points both of which are exterior of the mandrel, the valve means itself being controlled by an instrumentality acting interiorly of the mandrel.

Turning to another aspect of this invention, pressure responsive valves heretofore employed in a well for various purposes, such as gas lifting, have usually incorporated a resilient or distortable member such as a bellows, diaphragm or a rubber sleeve, to act as a pressure responsive means to open and close the valve. Such types of distortable members are subject to failure either through excess distortion or rupture (particularly in the case of bellows or diaphragm) or being adversely affected by well fluids (as in the case of rubber sleeves). Also such valves have commonly been mounted off-set from the tubing or coaxially therein. The off-set mounting requires considerably larger casing or well bore sizes to accommodate the tubing so equipped with the valves than would be required to receive the tubing alone. In the coaxial mounting, the bore of the tubing is obstructed and well or wire line tools cannot be run therethrough without first removing the valve. Still further, such valves have incorporated a seat having a seating surface upon which a valve member seats a corresponding seating surface to control flow therebetween and through the valve. Such seat and seating surfaces must fit or mate closely together when the valve is closed to prevent leakage through the valve. They are given to failure due to erosion thereof by well fluids or for other reasons. For example, slight leakage across these surfaces when seated causes erosion which in turn increases the leakage. Further, when the valve is partially opened or even fully opened, the rush of fluid between the mating seating surfaces causes wear or erosion thereof particularly when the fluid flowing therebetween is gas cut or carries abrasive particles, such as sand.

It is therefore another object of this invention to provide a pressure responsive valve for use in a well in which the valve means for controlling flow through the valve includes an annular piston acting as a pressure responsive means by being exposed to the pressure of a control fluid to control opening and closing of the valve means thereby eliminating a need for distortable pressure responsive members and also permitting the valve means to be arranged around the bore of a tubing instead of therein or laterally off-set to one side of the tubing.

Another object is to provide such a valve wherein the piston is exposed to the pressure in a charge chamber to be urged in another direction and provides a movable partition or seal between the charge and control pressures to retain the charge fluid in its chamber.

Another object is to provide a valve for controlling flow of fluid between the interior and exterior of a well conduit wherein a valve means includes a piston providing a flow port adapted upon reciprocation of the piston to be moved into and out of register with another flow port to control flow through the valve withut necessitating the seating together of closely fitting or mating seating surfaces of a seat and valve member.

Another object is to provide a valve for controlling flow of fluid between the interior and exterior of a well conduit wherein a piston is provided to act as a pressure responsive means for opening and closing the valve means and also provides a port adaptable to be brought into and out of register with another port to control flow through the valve so that not only does the piston eliminate the need for the usual distortable pressure responsive member but also eliminates the need for closely fitting or mating seating surfaces to control flow through the valve.

Another object is to provide such a valve in which the inlet ports are arranged to impinge a plurality of streams of fluid flowing through the valve upon each other so that impingement and consequent wear upon the valve is reduced.

Another object is to provide a pressure responsive valve in which a pressure responsive means controls movement of a valve member between open and closed positions and in which the valve member provides a port adapted to be brought into and out of register with a flow passage in the valve in such a manner that pressure applied through said passage does not exert any substantial force in urging the valve member toward open or closed positions so that operation of the valve is substantially unaffected by pressure acting on the valve member.

Another object is to provide a valve in which a piston is urged in one direction by pressure of fluid in a charge chamber and in another direction by a control fluid, the piston having a flow port movable with the piston into and out of register with a flow port in the valve, the port in the piston being arranged so that the effective area thereof acted upon by fluid to urge the piston in one direction substantially equals the effective area acted upon to urge the piston in the other direction whereby fluid within the port does not substantially influence movement of the piston.

Another object of this invention is to provide a sealing arrangement particularly useful in effecting a sliding seal between two relatively movable members and in which the seal is so arranged that one face of the seal is exposed to pressure exteriorly of one member to urge an opposing face of the seal into sealing contact with the other member.

Another object is to provide such a sealing arrangement constructed so that the seal can move across ports, annuli or the like without pinching, cutting or abrading the resilient material of the seal even through there may exist a pressure differential across the seal urging it into such ports, annuli or the like.

Another object is to provide a sealing arrangement for sealing across an annular space between two members wherein a continuous body of resilient sealing material extends circumferentially around one of such members and laterally across the same to expose one face to a fluid pressure which acts thereon to urge an opposing face of the body of sealing material across said annular space, there also being provided bridging elements across the body of sealing material to connect together the portions of said one member lying to either side of said body of sealing material.

Other objects, advantages and features of this invention will be apparent to one skilled in the art upon a consideration of the written specification, the appended claims, and the attached drawings wherein:

FIGS. 6A and 6B are views similar to FIGS. 5A and 5E illustrating a valve adapted to be installed in a well in a manner similar to that shown in FIG. 2, it being understood that the structure of FIGS. 5B and 5C is to be used with that of FIGS. 6A and 6B in a top-to-bottom order of 6A, 5B, 5C and 6B;

Like characters of reference are used throughout the several views to indicate like parts.

Figure 1:
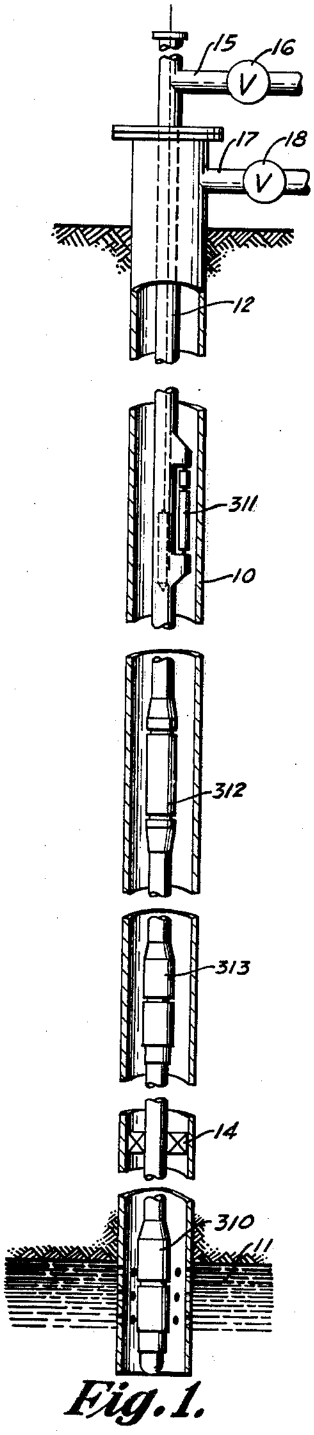
FIG. 1 is a diagrammatic view illustrating an installation in a well in accordance with one embodiment of the system of this invention and also showing various valves of this invention installed to act as gas lifting valves.

In accordance with the system of this invention, a pressure responsive valve is disposed in a well to control flow of formation fluid from a producing formation into a well conduit or tubing in such a manner that the valve will regulate flow into the conduit so as to maintain a selected back pressure on the formation. Stated in another manner, the valve desirably maintains a substantially constant "sand-face differential." The valve means is so arranged that the pressure of the formation fluid between the formation and the valve means is the control variable which exerts a dominating influence upon the opening and closing of the valve means and pressures of fluids in other portions of the well, while they may exert some relatively minor influence, are for all practical purposes dominated in this respect by the action of the pressure of the formation fluid. Thus, for example, if the valve means is set to maintain 800 pounds per square inch back pressure, any increase or decrease in formation pressure will result in a corresponding increase or decrease in the flow rate into the tubing so that the back pressure remains at 800 pounds. Also, any change in tubing pressure or well head pressure downstream of the valve means as by fluctuation in separator pressures, fluid head in the tubing, gas lifting, etc., will not effect a change in the 800 pounds per square inch back pressure being maintained by the valve.

In accordance with one aspect of the system of this invention, means are provided for changing, by manipulation controlled from the earth's surface, the back pressure maintained by the valve means on the formation. With such arrangement, it is possible to adjust the back pressure maintained on the formation to be a maximum consistent with the production of the desired volume of well fluid irrespective of tubing pressure and other factors. This means that the gas-to-oil ratio can be maintained at a minimum and also that the bottom hole pressure of the well maintained over longer periods of time instead of being depleted by excessive withdrawal of gases due to not maintaining sufficient back pressure on the formation. Also, water coning, excessive flow rates due to failure or improper operation of surface equipment, etc., are prevented.

The foregoing concept of the system of this invention is exemplified by the apparatus shown in FIG. 3; it being understood that other arrangements of apparatus are possible in accordance with the concept of the system and several of these will be described in detail hereafter. Thus, referring to FIG. 3, there is shown a producing well having a casing 10 extending to a producing formation 11 to receive formation fluids therefrom. Also extending into the well is a tubing 12 which, in this instance, is closed at its lower end as at 13 and provided with a packer 14 sealing the annulus between the tubing and casing. A well head is provided with the usual structure including a flow line 15 receiving fluid from the tubing 12 and controlled by a valve 16 or other suitable means. Another conduit 17, including a valve 18, communicates with a tubing-casing annulus and can be used to supply gas to the annulus in the event the well is to be equipped with gas lift valves above packer 14.

The tubing is provided with a passage, designated generally by the numeral 19, disposed to provide fluid communication between formation 11 and a point interior of tubing 12. The valve means, designated generally by the numeral 20, are provided substantially adjacent formation 11 to control flow through the passage. Opening and closing of the valve means is controlled by a pressure responsive means 21 connected thereto and urging the valve means toward closed position but controlling opening and closing of the valve means in response to the pressure of formation 11 existing upstream of the valve means.

Figure 4:
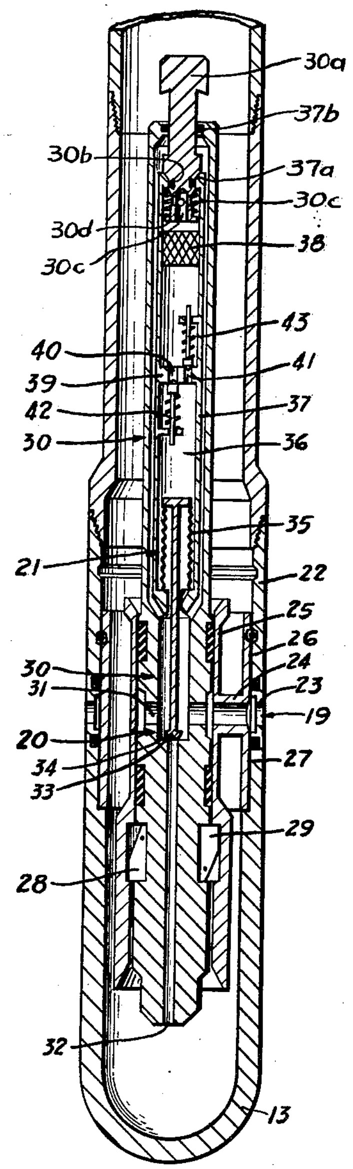
FIG. 4 is an enlarged view of the lower portion of FIG. 3 to better illustrate the details thereof.
Figure 3:
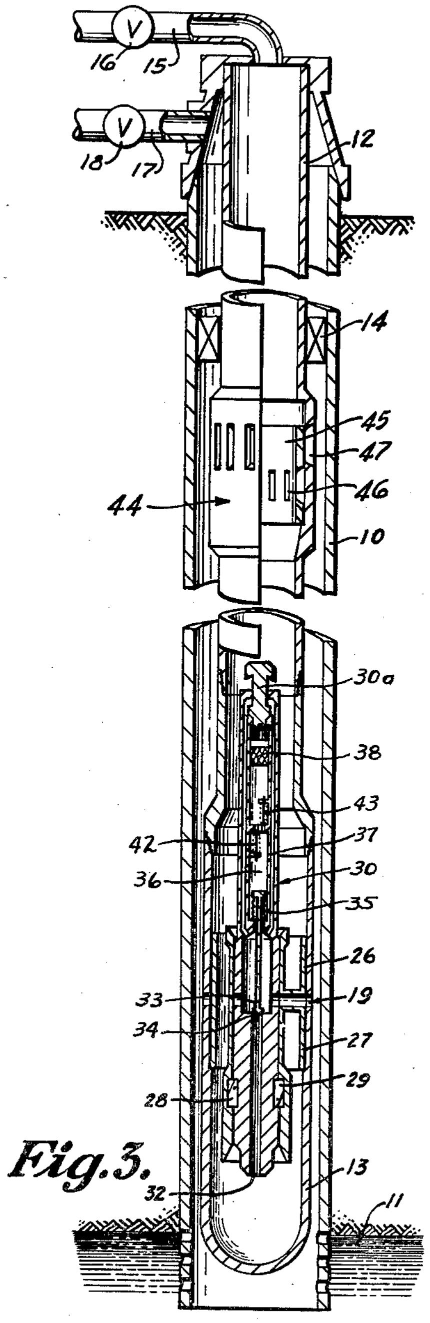
FIG. 3 is a diagrammatic illustration of a well installation showing another embodiment of the system of this invention arranged for controlling flow from a formation into tubing, in which a packer has been set between the tubing and well casing.

Referring more specifically to the apparatus shown in FIGS. 3 and 4, a mandrel 22 can be provided with an inlet port 23 communicating through a web 24 with a port in an inner sleeve 25. An outer sleeve 26 is disposed in mandrel 22 to be shiftable between two positions therein so as to move the passage in web 24 into and out of register with port 23. When the passage is moved out of register with port 23, an imperforate portion 27 of the outer sleeve 26 is positioned across port 23 to prevent flow therethrough. In this manner, valve means are provided to block and permit flow into or out of the tubing independently of valve means 20.

The pressure responsive valve means 20 for maintaining a selected back pressure on formation 11 are arranged in this embodiment so as to be landable in inner sleeve 25 by a wire line operation and secured therein upon release of dogs 28 and 29 to abut opposing shoulders in an extension of inner sleeve 25 which comprises a receiver. Accordingly, manipulation of the valve means 20 permits sleeve 26 to open and close port 23 and the arrangement is such that upon pulling upwardly on valve means 20 to remove the same, dog 29 is not released until sleeve 26 has been moved to closed position thereby assuring that fluid cannot pass into the tubing except under the control of valve means 20.

The valve means generally comprises a housing 30 having an inlet port 31 and an outlet port 32. A seat 33 and valve member 34 are provided to control flow between these ports and hence through port or opening 23 which is a portion of passage 19. The valve member is connected to a pressure responsive means, here illustrated as a bellows 35, which is exposed on its inner side to the pressure of fluid from port 31 and its outer side to the pressure of fluid in a charge chamber 36. With this construction, it will be noted that the pressure responsive member urges valve member 34 toward closed or seated position due to the pressure in chamber 36 acting across the effective area of bellows 35. On the other hand, the pressure of formation fluid acting through passageway 19 upstream of seat 33 acts on bellows 35 to thereby urge valve member 34 toward open position.

It will be noted that chamber 36 is illustrated as being defined by an inner housing 37 which has its lower end sealed to the fixed end of bellows 35 and arranged to permit fluid communication between passage 19 and the annulus between inner housing 37 and housing 30. The upper end of the inner housing is arranged so that fluid can flow through a straining element, such as plastic member 38, into or from charge chamber 36 so that pressure from the formation fluid acting through passage 19 can be applied to that in charge chamber 36 to vary the operating characteristics of the valve means without removing the same from the well. It will be understood that the above-mentioned annulus will act as a reservoir to contain a resilient fluid and that formation fluid must move all of the reservoir fluid through element 38 before the formation fluid can flow therethrough.

In order to prevent an increased formation pressure from pressuring up the charge chamber each time the well is shut in, valve means are provided preventing flow from the formation to the charge chamber except when such valve means are opened by a control exercised from the earth's surface, as by wire line. Thus, wire line head 30*a* can be constructed as a reciprocable valve member seating across a seat 37*a* at the upper end of inner housing 37. Seat 37*a* can be formed as a cylinder to receive a piston-like portion of head 30*a* bearing a seal, such as O-ring 30*b*. A similar seal 37*b* can be provided in an inturned portion at the upper end of housing 30 to form a sliding seal with head 30*a*. Also, means are provided urging the head toward seated position and can comprise a spring 30*c* acting between the inturned portion of housing 30 and a guide extension 30*d* on head 30*a*. The guide extension should have a fairly close fit within inner housing 37 in order that it can, with seal 37*b*, maintain the head in seating alignment with seat 37*a*. To facilitate flow across the seat and head when unseated, guide extension 30*d* can be provided with an inner bore 30*c* having ports at its upper end communicating with the exterior of the head just below seal ring 30*b*.

In accordance with one aspect of this invention, means are provided which are selectively operable to apply the pressure of fluid exteriorly of charge chamber 36 to the interior thereof to raise and lower the pressure in the chamber by a predetermined amount where the pressure of the fluid exteriorly of the chamber is respectively higher and lower than that in the chamber and also operable to prevent the application of pressure of the exterior fluid to that in the chamber despite substantial variation in the pressure of the exterior fluid from that in the chamber. As shown in FIG. 4, such means takes the form of a partition 39 disposed in inner housing 37 to define the upper end of charge chamber 36. Partition 39 has ports 40 and 41 therethrough along with oppositely disposed spring loaded check valves 42 and 43 controlling flow through the ports. The springs on these check valves can be set or selected to exert a predetermined force holding the check valves in seated position. The springs will thus maintain the respective check valves closed until the formation pressure exceeds or falls below that in charge chamber 36 by a predetermined amount. The amount which the formation pressure must exceed the charge pressure in order to open check valve 42 can be the same as or different from the amount it must fall below the charge pressure in order to open check valve 43. The springs can be made strong or weak to determine the range through which the formation pressure can vary without effecting the charge pressure. In any event, the check valves will always maintain the charge pressure so that the difference between itself and the pressure of the formation fluid from port 23 will always be less than a predetermined amount.

Means are also provided which are manipulatable from the surface of the earth for controlling the selectively operable means described above to cause the latter to apply and prevent the application of the formation pressure to that in the charge chamber. In the embodiment of FIG. 3, such means includes not only valve 16 in line 15 but also a means for establishing communication between the earth's surface and the tubing-casing annulus below packer 14. This latter means can include a valve 44 comprising a sleeve 45 shiftable in the tubing to place ports 46 in the sleeve in and out of register with ports 47 in the tubing. The sleeve 45 is shiftable in this instance by a wire line tool between open and closed positions.

In operation of the system embodied in FIG. 3, let it be assumed that tubing 12 has been positioned in the well with packer 14 in place and with sleeves 26 and 45 in closed position. The pressure responsive valve means can then be lowered into the well by a wire line tool releasably connected to head 30*a* and latched in position in inner sleeve 25 and the landing extension thereof. In so landing the valve, sleeve 26 is moved to open position thereby permitting formation fluid to flow through passage 19 and to act against bellows 35. At the same time, the foramtion fluid exerts its pressure on fluid in the annulus between housings 30 and 37 and hence upon check valves 42 and 43, head 30*a* being held in open position by an upward pull exerted thereon by the wire line tool.

For the construction shown in FIGS. 3 and 4, charge chamber 36 will be substantially at atmospheric pressure when valve 20 is inserted in the tubing and the pressure of this chamber will increase upon landing valve 20 in sleeve 25 and establishing communication between check valves 42 and 43 and formation 11 via passage 19, the annulus between housings 30 and 37 and the unseated head 30*a*. The pressure in the charge chamber will thus be less than that of the formation by an amount determined by the strength of the spring on check valve 42. The strength of this spring and that of check valve 43 are preferably great enough, particularly when the seating arrangement of head 30*a* is not employed and the upper end of housing 37 left open, to afford a range of pressures through which the formation fluid can vary without opening either of the check valves and yet permitting opening and closing of valve 20 at a pressure within such range. Stated in another manner, the pressure required to be exerted by the formation fluid to open valve 20 against the opposing force of the pressure in the charge chamber acting across bellows 35 is less than that required to open either of check valves 42 and 43. Such an arrangement permits valve 20 to open and close to control flow into the tubing and hence maintain a selected back pressure on the formation without having its own characteristics incidentally changed during its normal operation by the formation fluid opening one of check valves 42 and 43. However, when head 30*a* is made to seat across the upper end of housing 37, a substantial increase in formation pressure over that in the charge chamber merely urges the head toward seated position while a decrease in such pressure will eventually cause the pressure interiorly of housing 37 to overcome spring 30*c* and unseat the head. Therefore, the range of pressures through which the formation fluid can vary without changing the charge pressure has only a lower limit. In this connection, check valves 42 and 43 can be eliminated and spring 30c made strong enough to provide a known differential between a lower formation pressure and a higher charge pressure in much the same manner as check valve 43 so that the pressure in the charge chamber can be lowered by lowering the formation pressure, in a manner described below, to a value equal to the desired charge pressure minus the differential maintained by spring 30c. On the other hand, the charge pressure can be raised by raising the formation pressure to a value equal to the desired charge pressure and unseating head 30a by a wire line tool. Also, spring 30c can be made strong enough to hold the head seated against well pressure at all times and a wire line tool employed to unseat the head when the charge pressure is to be either increased or decreased.

Upon landing of valve 20 and moving sleeve 26 to open position, the pressure in the charge chamber may be less than or greater than that necessary to maintain a selected back pressure on formation 11. In some cases, the resulting back pressure maintained on the formation will be too high to achieve the desired rate of production of the well. In such event, sleeve 45 can be moved to open position, if it had not been moved to such position prior to landing of valve 20, and valve 16 opened to permit a more rapid flow from the well and thereby decrease the pressure in the tubing-casing annulus below packer 14. In this connection, ports 46 and 47 of valve 44 can be sized to provide an area substantially equivalent to that in the flow tubing so that opening of the valve 44 permits the bleed down of the formation at the full capacity of the tubing. As the bottom hole pressure drops, the pressure in charge chamber 36 will also decrease (head 30a being held open by either the wire line tool or by the pressure differential thereacross) but a predetermined differential will always be maintained between the charge pressure and the bottom hole pressure by the spring on check valve 43. Since this differential is known or can be determined before the valve is inserted in the well, it is possible to regulate valve 16 to obtain a selected charge pressure in chamber 36. When valve 43 is not employed and spring 30c made strong, the bottom hole pressure can be lowered to a value equal to the selected charge pressure and then head 30a seated or, where spring 30c maintains a known differential, the bottom hole pressure lowered to a value equal to the charge pressure minus the differential maintained by spring 30c to give the selected charge pressure. This selection of the charge pressure will determine the back pressure maintained on the formation and it will be so maintained because should the formation pressure increase, valve member 34 will be moved to a more open position to increase flow through the valve and thereby decrease the back pressure and vice versa. After the desired charge pressure has been obtained, valve 44 is, of course, moved to closed position. Valve 16 can then be opened and valve 20 will control production from the well.

On the other hand, if the charge pressure in chamber 36 is too low so that the back pressure on the formation is likewise too low, valve 16 can be partially or completely closed to raise the pressure in the tubing and hence that of the formation fluid flowing through passage 19. Then upon unseating head 30a, the rise in pressure will eventually cause check valve 42 to open and permit the charge pressure to be increased. When check valve 42 is not employed, head 30a is seated when the formation pressure rises to a value equal to the desired charge pressure.

The exact mode of use of the apparatus shown in FIG. 3 will be somewhat dependent upon the characteristics of the individual well. In some wells, it will be possible to land valve 20, open valve 44 and then adjust valve 16 to give the desired rate of production after which valve 44 is closed and valve 16 opened. Such manipulation automatically charges valve 20 (head 30a being held open) to a value substantially such as to maintain the desired rate of production and yet maintain the maximum back pressure on the formation consistent with such rate. Such a back pressure maintains a minimum gas-to-oil ratio because the pressure on the formation fluid is not excessively reduced before it flows into the tubing to permit excessive quantities of gas to break therefrom. On the other hand, when the rate of production is to be adjusted so that the gas-to-oil ratio is either at a desired value or as low as possible, valve 20 is landed in the well as before and valves 44 and 16 opened to substantially reduce the bottom hole pressure and hence the charge pressure of valve 20. The production rate and gas-to-oil ratio can then be measured and if a higher back pressure is desired on the formation, valve 16 partially closed to increase the bottom hole pressure of the well and hence the charge pressure in chamber 36. Valve 16 can then be opened and the production rate and gas-to-oil ratio measured again. By gradual increase in the charge pressure in chamber 36, the desired back pressure on the formation can be obtained. After the desired charge pressure has been attained, the wire line tool can be released from head 30a and thereafter, even if the well is closed in, increasing formation pressure cannot alter the charge pressure. This saves re-adjusting the charge pressure each time the well is placed in production after having been closed in.

The construction of valve 44, the receiver and valve means comprising sleeves 25 and 26 and that of dogs 28 and 29 has been shown somewhat schematically and for a more detailed description thereof, reference is made to co-pending applications Serial No. 330,294, filed January 8, 1953, now United States Letters Patent 2,804,830, and Serial No. 414,924, filed March 9, 1954, now United States Letters Patent 2,790,395.

Figure 2:
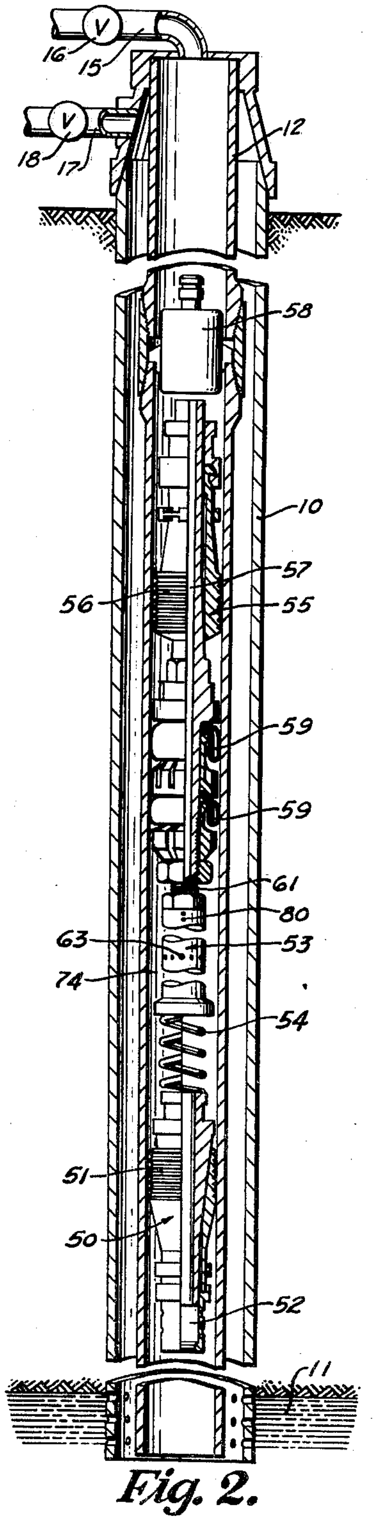
FIG. 2 is another diagrammatic illustration of a well installation showing one embodiment of the system of this invention in which valve means are landed in the tubing and adapted to control flow thereinto from a formation whether or not a tubing-casing packer has been installed in the well.

In FIG. 2 there is illustrated another embodiment of the system of this invention and one which is particularly adapted for use in a flow tubing without necessarily providing special landing means therein and particularly for a tubing which is not packed off from the casing by a packer. In this figure, tubing 12 is left open at its bottom so that production from formation 11 can flow upwardly therethrough. Disposed within a tubing is a stop 50 which can be of the type having outwardly expansible slips 51 adapted to engage the interior of the tubing when the device is landed by a wire line manipulation. The stop includes a central passage 52 to permit production from formation 11 to flow therethrough. A pressure responsive valve similar in action to valve 20 in FIG. 3 but of different and improved construction is designated generally by the numeral 53 and shown in more detail in FIGS. 5A through 5E. Valve 53 can be provided with a resilient means such as a spring 54 to cushion its initial contact with stop 50 and also to urge the valve upwardly so that landing device 55 will be maintained in latched position in the tubing. The latter device is one of the type to which a well tool (e.g. valve 53) can be secured and then the entire assembly lowered through a tubing to be releasably locked therein at a selected depth by expansion of slips 56. Device 55 also includes a bore 57 permitting well fluids to flow upwardly therethrough.

If desired, another stop 58 can be positioned above device 55 to prevent any tools being manipulated in the tubing thereabove from striking device 55 so as to either accidentally disengage dogs 56 or to completely compress spring 54. Thus stop 58 can be employed to provide a bottom stop for a free piston or plunger if one is to be used in the well. It should be noted that device 55 also includes seals 59 which in effect prevent flow through the tubing except through valve 53 and bore 57 with which a discharge port in the valve communicates.

Turning now to FIGS. 5A through 5E, a more detailed description of valve 53 will be given. The valve comprises a housing 60 which can be constructed of a plurality of components to facilitate manufacture of the housing as well as assembly and disassembly of the valve. The upper end of the housing is provided with a threaded portion 61 for connection with landing device 55. The housing is also provided with a flow passage 62 including inlet port 63, outlet port 64, and an innerconnecting passage comprising portions 65, 66 and 67. With disposition of valve 53 as shown in FIG. 2, passage 62 forms a part of the flow passageway between formation 11 and a point interior of tubing 12.

Valve means are provided for controlling flow through this passage and can include an annular seat 68 co-operating with a valve member 69. The valve member is carried on a valve stem 70 which terminates in a head 71. Resilient means in the form of a bellows 72 are connected between the housing and head 71 to define a charge chamber 73 in the housing adapted to receive a charge of resilient fluid under pressure. It will be noted that fluid from formation 11 can pass upwardly through bore 52 of stop 50 and annulus 74 (FIG. 2) and thence through inlet port 63 and an annulus 75 to act on the interior of bellows 72 and urge valve member 69 toward unseated position. The pressure in chamber 73 of course urges the valve member toward seated position by acting across the effective area of the bellows.

Referring back to FIG. 3, it will be evident that the formation pressure acts through passage 19 to unseat valve member 34 over an effective area equal to the effective cross-sectional area of the bellows minus the cross-sectional area of seat 33. Tubing pressure downstream of valve 20 acts through port 32 on valve member 34 to urge it toward open position by a force equal to the tubing pressure times the cross-sectional area of seat 33. It is preferred that the effective area acted upon by the formation pressure to urge the valve toward open position be made large relative to that acted upon by the tubing pressure downstream of the valve and influencing opening and closing the valve (e.g. by acting on valve member 34 through seat 33) so that the formation pressure exerts the dominant force controlling movement of the valve member between open and closed positions. When valve 20 is fully open, of course, the formation pressure is substantially the only pressure which keeps the valve open.

In the valve illustrated in FIGS. 5A through 5E, means are provided for rendering ineffective or counter-balancing an unwanted force exerted by a fluid pressure in opening or closing of the valve by providing a pressure responsive means exposed to the same pressure and so connected to the valve that it applies a force opposing the unwanted force and hence decreases or eliminates the effectiveness of the unwanted force. Thus, a pressure responsive member in the form of a piston 76 and disposed to reciprocate within cylinder 77 is connected by a stem 78 to valve member 69. Cylinder 77 defines a chamber 79 at one end of piston 76 so as to prevent pressure applied to the other end of the piston from being applied to both ends thereof. With this arrangement, it will be seen that the pressure downstream of seat 68 in pasasge portion 65 acts to move piston 76 into cylinder 77 and also acts to move valve member 69 off its seat. These opposite forces tend to counterbalance each other and by making the cross-sectional area of piston 76 equal to that within seat 68, the effect of pressure downstream of the valve seat can be counterbalanced so that the only pressure effective in moving the valve between open and closed positions is the upstream pressure acting through ports 63 and the charge pressure in chamber 73. The valve then, in effect, is sensitive for its control only to pressure exteriorly of the valve and flowing upstream of seat 68.

As pointed out above, cylinder 77 defines with one end of piston 76 a chamber 79. This chamber can have pressure upstream of valve seat 68 applied thereto, such as through ports 80*a* in order that the effective area acted upon by the upstream pressure will be equal to the effective area of the bellows, the latter being the same in area as the charge in chamber 73 acts to urge the valve toward closed position.

An improved means is provided for changing the pressure in charge chamber 73 through a manipulation of the formation pressure as it exists upstream of valve member 69. In effect then, opening and closing of valve 53 is responsive to the pressure of formation fluid flowing between the formation and the valve and at the same time, such formation pressure can also be employed to determine the pressure in the charge chamber so that it becomes a control upon itself.

Figures 5A, 5B, 5C:
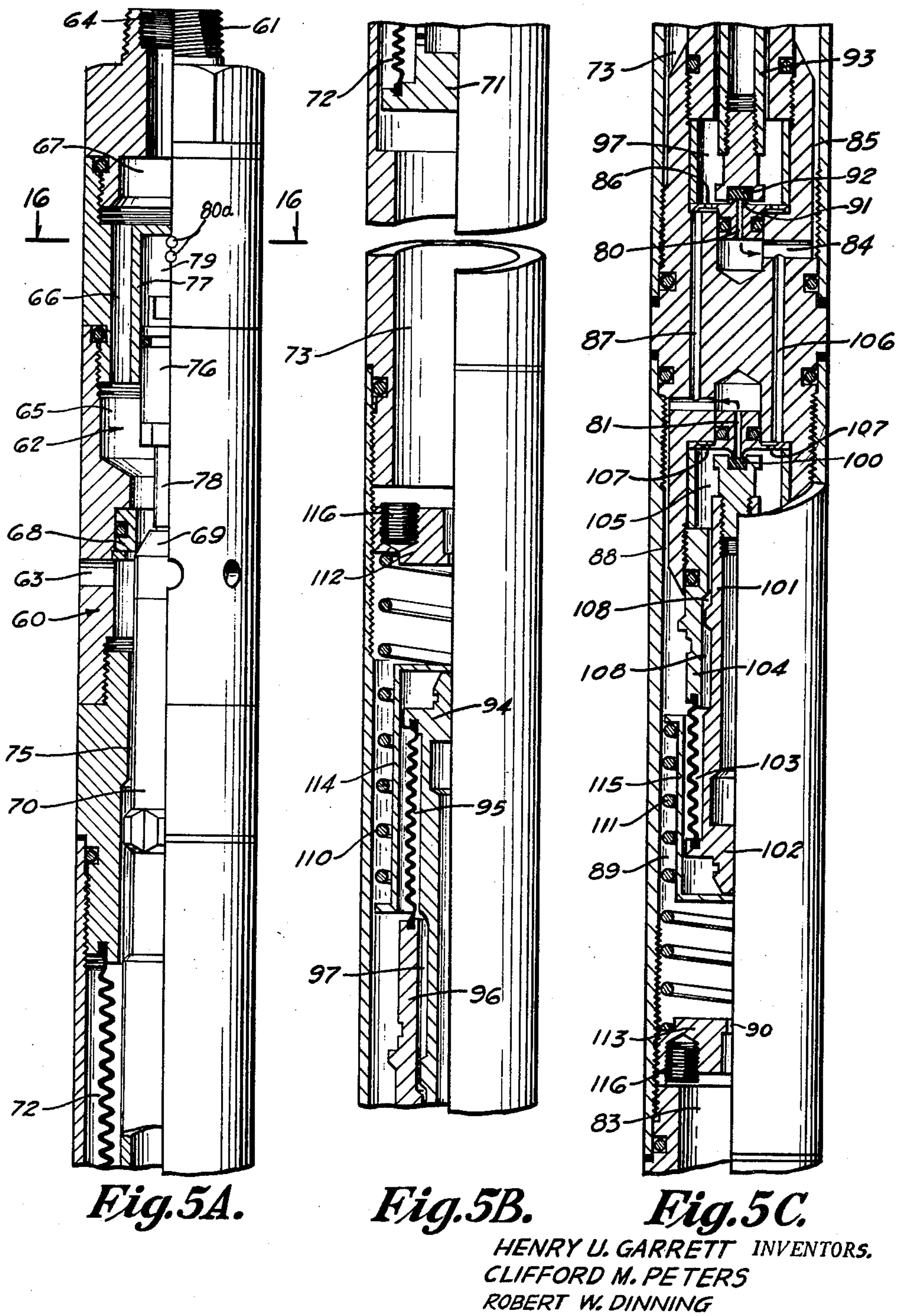
FIGS. 5A, 5B, 5C and 5D are detail views, partially in vertical cross-section, showing one embodiment of an improved valve of this invention and which can be installed in a well such as is shown in FIG. 2, it being understood that these views are continuations one of the other from top to bottom of the valve in the order of the views above enumerated.

In FIG. 3, simple spring loaded check valves 42 and 43 are illustrated for regulating inflow and outflow of charge fluid from chamber 36. An improved means for regulating such flow is shown in FIGS. 5B and 5C. Thus there is provided ports 80 and 81 for respectively conducting flow into and out of charge chamber 73 from a reservoir chamber 83 upon which the pressure of the formation fluid upstream of valve member 69 is impressed. Thus, port 80 is connected by passages 84 and 85 to charge chamber 73 and by passages 86 to 90, inclusive, to the main portion of the reservoir chamber. A raised seat 91 is provided around port 80 to cooperate with a valve member or element 92 to control flow through the port. Valve member 92 is carried by a stem 93 terminating in a head 94. A bellows 95 has its movable end connected to head 94 and its fixed end to a housing part 96 which, with the bellows and head 94, provide a chamber 97 upstream of port 80 and subjected to the pressure of reservoir 83. Thus the pressure in chamber 97 acts on the pressure responsive means (within bellows 95) to urge valve member 92 toward unseated position in opposition to the pressure in chamber 73 acting on the pressure responsive means to urge the valve member toward seated position. In this manner, the pressure in charge chamber 73 acts not only to urge valve member 69 of the main valve 53 toward seated position but also to oppose opening of valve member 92 to increase the pressure in the charge chamber. However, when the pressure in reservoir 83 becomes sufficiently great, it will overcome the force exerted by the pressure in charge chamber 73 and move valve member 92 off its seat to permit flow into the charge chamber 73.

A similar arrangement is provided for controlling outlet port 81. Thus flow through port 81 is controlled by a valve member 100 carried on the stem 101 terminating in a head 102. Bellows 103 is affixed to head 102 and a housing part 104 to define with the head a chamber 105 to which is applied the pressure from charge chamber 73 via passages 85, 84, 106 and 107. Pressure in this chamber is applied to the interior of bellows 103 via passage 108 to urge valve member 100 toward unseated position. The exterior of the bellows is, of course, exposed to the pressure of reservoir chamber 83 which urges valve member 100 toward seated position.

The differential between the pressure in reservoir chamber 83 and charge chamber 73 required to unseat one of valve members 92 and 100 is, for the construction shown, determined largely by springs 110 and 111 which urge the respective valve members toward closed position by respectively bearing against adjusting heads 112 and 113 and spring retainers 114 and 115, the latter abutting heads 94 and 102. Adjusting heads 112 and 113 can be screw threaded into the housing so that the compression of springs 110 and 111 can be readily adjusted and in this sense, plugs 116, each having a central opening therein for receiving a wrench part, can be provided in the adjusting heads to permit them to be screwed into or out of the housing. The effective strength of the respective springs, either determined by their own characteristics or by adjustment of the heads 112 and 113 can be equal to or different from each other.

With the foregoing arrangement, it will be apparent that when the pressure in reservoir chamber 83 falls sufficiently below that in charge chamber 73, the pressure in the charge chamber will unseat valve member 100 so that fluid can flow from the charge chamber through passages 85, 106, port 81 and thence through passages 88, 89 and 90 into the reservoir chamber. When the pressure in the charge chamber has been reduced so that its opening force on bellows 103 is less than the closing force exerted by spring 111 plus the closing force of the reservoir pressure acting exteriorly of bellows 103, valve member 100 will be moved to closed position. When the pressure in the reservoir chamber 83 exceeds that in the charge chamber 73 by a predetermined amount, valve member 92 will be moved to open position due to the force exerted by the reservoir pressure acting interiorly of bellows 95 becoming greater than the combined forces exerted by the charge pressure acting exteriorly of bellows 95 and spring 110. Fluid will then flow from the reservoir through passages 90, 89, 88, 87 and 86, through port 80 and thence through passages 84 and 85 into charge chamber 73 to increase the pressure therein.

It is preferred that the cross-sectional area of ports 80 and 81 be made sufficiently small compared to the effective area of bellows 95 and 103 so that pressure acting through these ports to urge the respective valve members toward open position exerts a relatively minor force as compared to that exerted by the charge and reservoir pressures acting across bellows 95 and 103. Such an arrangement means that though those areas of the valve members which are within ports 80 and 81 are subjected to one pressure when the valve members are seated and to another and different pressure when the valve members are unseated, the resulting difference in force generated by such difference in pressures is relatively insignificant compared to the over-all force acting on the bellows. As a result, the valves controlling flow through these ports do not require one control pressure for opening and a different control pressure for closing. Further, the small size of the ports 80 and 81 plus their relatively great length as compared with their cross-sectional area provides restricted flow between the charge and reservoir chambers permitting a more accurate control of the pressure in the charge chamber.

While it was indicated above that fluid for charge chamber 73 can be derived from reservoir chamber 83, it is possible to eliminate the reservoir chamber. However, in many cases it may be undesirable for well fluids, particularly liquids, to be injected into the charge chamber via ports 80 and 81. Further, submersion of the pressure responsive valves controlling flow through ports 80 and 81 in a liquid would slow down their action and cause the change in pressure in the charge chamber to be at a very slow rate due to the fact that liquid will flow through the small ports at a much lesser rate than will a gas. Also, the well liquid may contain debris or particles tending to clog ports 80 and 81.

Accordingly, reservoir chamber 83 can be provided to contain a gas for passage through port 80 into charge chamber 73 and to receive fluid from the charge chamber, the gas in the reservoir chamber having the formation pressure applied thereto to actuate the valves controlling ports 80 and 81. The reservoir chamber can be made of sufficient volume that when it is filled with gas and valve 53 is lowered into the well, the contemplated maximum formation pressure will not compress the gas in the reservoir chamber sufficiently to permit the formation fluid to rise through the reservoir chamber and flow through either of ports 80 or 81 or to otherwise interfere with the operation of the valves controlling these ports. One way of providing such an arrangement is to leave the lower end of reservoir chamber 83 open at all times and to make it of sufficient length or volume so that when it is inserted in inverted position in the well, the rise of well fluids therein to compress the gas from its original atmospheric pressure to that of the formation will still not permit the formation fluids to interfere with the mechanism for changing the pressure in the charge chamber.

Figure 5D:
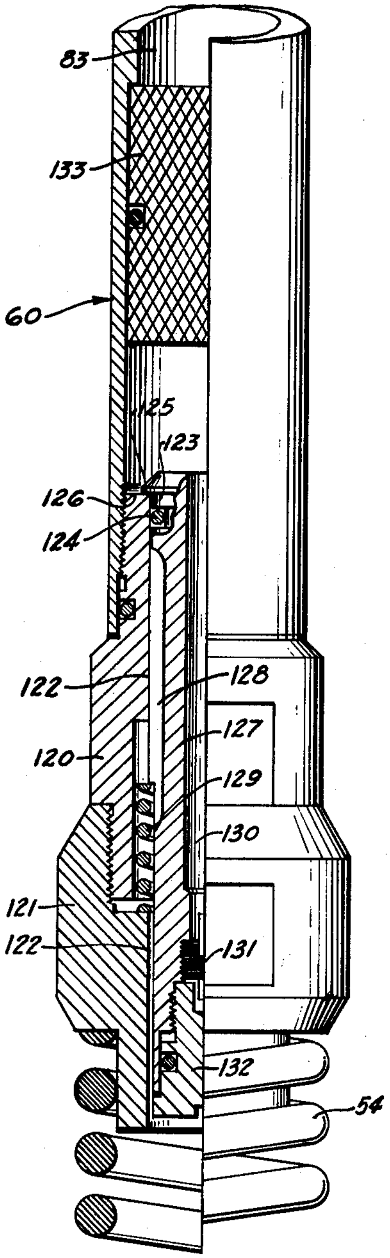
Figure 5E:
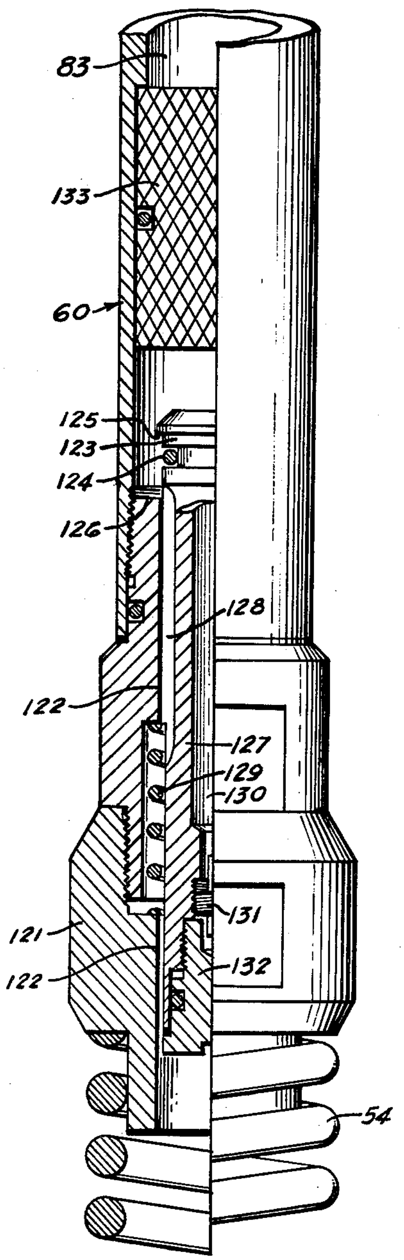
FIG. 5E is a view similar to FIG. 5D except that the mechanism for permitting flow into and out of a reservoir chamber of the valve is shown in open position whereas it is shown in closed position in FIG. 5D.

A more preferred arrangement and particularly one more useful in wells having substantial bottom hole pressures is shown in FIGS. 5D and 5E. Thus, as shown in FIG. 5D, the lower end of the reservoir chamber is provided with a mechanism controlling opening and closing of the chamber and adapted to seal the chamber so that it can contain a pre-charge of resilient fluid injected thereinto before the valve is lowered into the well. Upon so lowering the valve into the well, the mechanism opens to permit the formation fluid to impress its pressure upon that in the reservoir chamber when the formation pressure has reached a predetermined high value. This arrangement permits the volume of chamber 83 to be made smaller than when the lower end of the chamber is left open at all times as discussed above. Thus, the lower end of the chamber is provided with headpiece 120 and 121 affording a port 122 communicating between the reservoir chamber and the exterior of the housing. Valve means are provided for controlling flow through this port and can comprise a piston head 123 equipped with a seal means such as O-ring 124 and adapted to be moved into closed position as shown in FIG. 5D where it extends across port 122 and causes seal 124 to effect a seal with the walls of the port. The piston can be shouldered outwardly as at 125 to abut another shoulder 126 on headpiece 120 to limit movement of the piston toward seated position in the port. With this arrangement, it will be seen that the pressure in reservoir chamber 83 will urge piston head 123 toward seated position as shown in FIG. 5D and maintain it in such position as long as the pressure exteriorly of the housing is substantially less than that in the reservoir chamber.

Connected to piston head 123 is a stem 127 having one or more longitudinal grooves 128 in its periphery arranged to conduct fluid between reservoir 83 and exterior of the tool when piston 123 is moved to open position as shown in FIG. 5E.

A resilient means in the form of spring 129 can be disposed between stem 127 and headpiece 121 to urge piston 123 toward open position as shown in FIG. 5E.

Means are also provided for charging reservoir chamber 83 with a resilient fluid at an elevated pressure before the structure is lowered into a well. Such means can include an inner bore 130 through stem 127 and piston 123 and a check valve 131 permitting fluid to be injected into chamber 83 but preventing reverse flow therefrom. A sealing plug 132 can be provided to assure fluid will not leak from reservoir 83 in the event check valve 131 fails or leaks.

With the above arrangement, piston 123 can be held in the position shown in FIG. 5D and a charge of fluid injected into reservoir 83. As the charge increases in pressure, it will exert a force across piston 123 sufficient to hold it in seated position against the opposing force of spring 129. In this manner, the chamber 83 can be charged to any desired pressure. As the tool is lowered into the well, the well pressure acts across an area equal to that within port 122 to urge piston 123 to unseated position. It is aided in this action by the force exerted by spring 129. Upon the mechanism being exposed to a sufficiently high well pressure, the latter will overcome the charge pressure in the reservoir chamber and move the piston to unseated position. Piston 123 will remain in unseated position due to the force exerted by spring 129 and to the fact that the pressure across the piston has been equalized. Accordingly, well fluids are free to flow into and out of the reservoir chamber through grooves 128 so as to increase and decrease the pressure therein and thereby change the pressure in charge chamber 73 as above described.

A filter, such as a plastic element 133, can be positioned in the reservoir chamber to prevent sand, particles of petroleum substances and other debris from entering the upper part of the reservoir chamber where they might eventually clog the valving mechanism. It is also contemplated that a piston can be mounted in the reservoir chamber to be slidable back and forth therein and thereby isolate the resilient charging fluid in the chamber on top of the piston from the well fluids acting on the bottom of the piston.

In the operation of the above described valve embodiment in the system of FIG. 2, it will be appreciated that seals 59 constrain flow of formation fluid to be through passage 62 in valve 53 and that the pressure of this fluid upstream of seat 68 controls not only seating and unseating of valve member 69 but also the charge in chamber 73 and hence the back pressure maintained on the formation. In the embodiment of FIG. 2, it is not necessary to install a valve such as valve 44 in FIG. 3, to reduce the formation pressure and hence the charge in valve 53. In this instance, valve 18 can be opened to bleed down the formation pressure from a previous operating level to a value sufficiently low to yield a desired pressure in charge chamber 73. Closing of valves 16 and 18 will cause the formation pressure to rise above a previous operating level and hence to increase the charge in chamber 73. In this manner, the charge pressure can be adjusted to any value from a maximum value equal to the shut-in bottom hole pressure of the well minus the differential required to open and close the valve controlling port 80 to a minimum value equal to the bottom hole pressure of the well when the casing is open at the earth's surface plus the differential required to open and close the valve controlling port 81. This range of adjustment is also obtainable with the system of FIG. 3. Further, the manipulation of the system of FIG. 2 can be as described above for FIG. 3 except that valve 18 is used to reduce the bottom hole pressure instead of valves 44 and 16 as in FIG. 2. It will be understood that a valve similar to valve 44 can be installed in the system of FIG. 2 so that both systems can be operated identically.

In some wells, it is desirable to provide valve means in the production conduit to control flow therethrough in such a manner that the pressure downstream of the valve means is maintained substantially at a preselected value. For example, it may be desirable for several reasons to deliver the production to the earth's surface at a predetermined pressure which is to remain substantially constant and not to exceed a certain value. Also, in some wells, it is desirable to at least partially reduce the pressure of the flowing production while it is flowing up the production conduit in the well so as to prevent freezing at the earth's surface. In FIGS. 6A and 6B, there is shown a modification of the valve of FIGS. 5A–5D so that opening and closing of the valve is controlled by the downstream pressure in such a manner as to maintain such pressure substantially constant irrespective of substantial fluctuations in the upstream pressure and to limit the downstream pressure to be less than a preselected value. Before referring to FIGS. 6A and 6B, it will be understood that the modified valve will have the structure shown in FIGS. 5B and 5C disposed between and joined to that shown in FIGS. 6A and 6B in the same manner that the structure of FIGS. 5B and 5C is described above as being connected to that of FIGS. 5A and 5D. As a result, the modified valve will comprise, from top to bottom the structures shown in FIGS. 6A, 5B, 5C and 6B, it also being understood that the outer casing shown in the lower part of FIG. 6A and in FIG. 6B extends continuously along the structures of FIGS. 5B and 5C to enclose the same.

As shown in FIG. 6A, valve seat 68a cooperates with valve member 69a to control flow through a passageway in valve body 60a and comprising an inlet port 63a, passage portion 65a and outlet port 64a. Valve member 69a is carried on valve stem 70 which, as in FIG. 5A, is connected to a head 71 and bellows 72. The interior of the bellows, however, is exposed to pressure downstream of seat 68a by providing a passage 65b extending from a point downstream of seat 68a to an annulus 65c which in turn is open to annulus 75. To prevent pressure from inlet port 63a from being exerted internally of the bellows, the valve stem is provided with a sliding seal, such as O-ring 70a, having a sealing engagement with a partition wall 70b carried by the valve housing between annulus 65c and inlet port 63a.

With the foregoing construction, valve member 69a will remain seated until the pressure downstream thereof falls below a predetermined low value such that the pressure in charge chamber 73 can move the valve member to unseated position. However, when the downstream pressure exceeds a predetermined value, it will act through passage 65b on the interior of the bellows to overcome the force of the charge pressure and thereby close the valve.

Preferably, the value of the pressure in charge chamber 73 is changed by manipulating the pressure downstream of seat 68a and to permit this, a passage is provided to communicate between the downstream side of the valve and the lower end of the reservoir chamber. Thus, an external sleeve 60b can be sealingly connected to and disposed around the valve body below inlet ports 63a and to be open to downstream pressure through port 60c. The lower end of sleeve 60b is provided with a plug 60d serving as a retainer for spring 54 and also permitting access to seal plug 132 and charging valve 131. It will be understood that sleeve 60b extends continuously to also surround the structures of FIGS. 5B and 5C when the latter is disposed between that of FIGS. 6A and 6B. The other parts of the downstream pressure responsive valve are similar in arrangement and function as those already described in FIGS. 5A–5D and a re-description at this point will not add to the clearness of the disclosure.

With the foregoing arrangement, the pressure responsive valve can be connected to a landing device 55 as shown in FIG. 2 and landed at any desired depth in a well upon a tubing stop 50. Fluid flowing upwardly through the tubing will be constrained to flow through the valve at such a rate that the downstream pressure is maintained substantially constant. It might be noted that by making the cross-sectional area of seat 68a equal to that within partition wall 70b, the pressure of fluid from inlet port 63a will act on equal but oppositely disposed surfaces so that its net force tending to move the valve member toward unseated position is substantially zero. As a result, opening and closing of the valve is controlled by downstream pressure and is substantially unaffected by the upstream pressure.

When it is desired to reduce the charge pressure in the valve of FIGS. 6A and 6B so that the downstream pressure to be maintained is likewise reduced, the tubing is opened at the earth's surface to bleed the downstream pressure to such value that the charge chamber pressure will be reduced a desired amount. When it is desired to increase the downstream pressure to be maintained by the valve, the tubing pressure above the valve can be increased to a value such as will cause the charge chamber pressure to increase the desired amount by injecting fluid from an external source into the tubing at the earth's surface. Of course, in making the changes in charge pressure, the tubing pressure above the pressure responsive valve will be adjusted to be above or below the desired charge pressure by an amount governed by the springs holding the valve members 92 and 100 on their seats, all as explained above.

It is contemplated that a series of the downstream pressure controlled valves can be spaced along the tubing to yield successive reductions in the flowing pressure in the tubing. Also, the other improved valves of this invention can be modified to be downstream pressure controlled and then employed to maintain flow through a tubing such as to yield a substantially constant downstream pressure.

As pointed out above, it is an object of this invention to provide improved valve means which are useful not only in the system of this invention but also generally to control flow of fluid into or out of a conduit in a well such as in gas lifting or other well operations. In accordance with one aspect of this invention, these improved valves are of the pressure responsive, pressure-charged type and are provided with means for changing the pressure in the charge chamber while the valve is located in the well. Such change is brought about under the positive control of an instrumentality controllable from the earth's surface and operable to initiate and prevent a change in charge pressure independently of the well pressures. Thus, referring to FIGS. 7A and 7B, there is provided a passage communicating between the interior and exterior of a tubing including inlet ports 150, chamber 151, and an outlet port 152 disposed in a valve housing designated generally by the numeral 153. Port 152 can be connected directly to a flow passage 154 leading to the interior of a mandrel or tubing section 155 or a check valve 156 can be disposed therebetween to prevent flow of fluid from the interior of the mandrel or tubing section to the exterior thereof.

Valve means are provided for controlling flow of fluid through the passage and can include a seat 157 and a valve member 158 cooperating therewith. The valve member is connected by a valve stem 159 and piston part 160 to a bellows stem 161 terminating in a headpiece 162.

Pressure responsive means are provided for moving valve member 158 between seated and unseated positions and can include, in addition to headpiece 162, a bellows 163 fastened at one end to the headpiece and at the other end to housing 153. In this manner, the pressure responsive means defines a normally closed charge chamber 164 in housing 153 adapted to contain a resilient fluid under pressure to urge the valve member toward seated position. While the pressure exteriorly of the valve can be permitted to act through ports 150 directly on the interior of bellows 163 in order to urge the valve member 158 towards unseated position, it is preferred that a piston 165 be provided on piston part 160. Piston 165, with its sliding seal 166, acts not only to prevent debris from falling down into the interior of the bellows but also isolates the bellows from well pressures such as would tend to permanently set or distort or to rupture the bellows. The cross-sectional area of piston 165 is preferably made equal to the effective cross-sectional area of the bellows thereby permitting the interior of the bellows below seal 166 to be filled with a protecting grease, as through a check valve 167 and port 168 and yet permitting the piston to move back and forth without causing it to be locked in one position by the grease.

Means are provided for controlling the application of pressure exteriorly of charge chamber 164 to the interior thereof in order that the charge pressure can be changed as desired. For the embodiment shown in FIGS. 7A and 7B, such means comprises a passage communicating between the interior of the chamber and the exterior of both the valve housing and tubing section 155 and comprising passage portions 170, 171, 172 and 173. The latter portion can be disposed in a connector piece 174 threaded into a lug 175 extending from mandrel or tubing section 176. The other end of the connector piece extends through a sliding seal 177 in headpiece 178 into the interior of the charge chamber. Such construction permits the pressure responsive valve and check valve 156, if desired, to be threaded into upper lug 179 while connector piece 174 is telescoped into headpiece 178. The connector piece can then be extended to be threaded into lug 175 as shown in FIG. 7B.

Figure 7A:
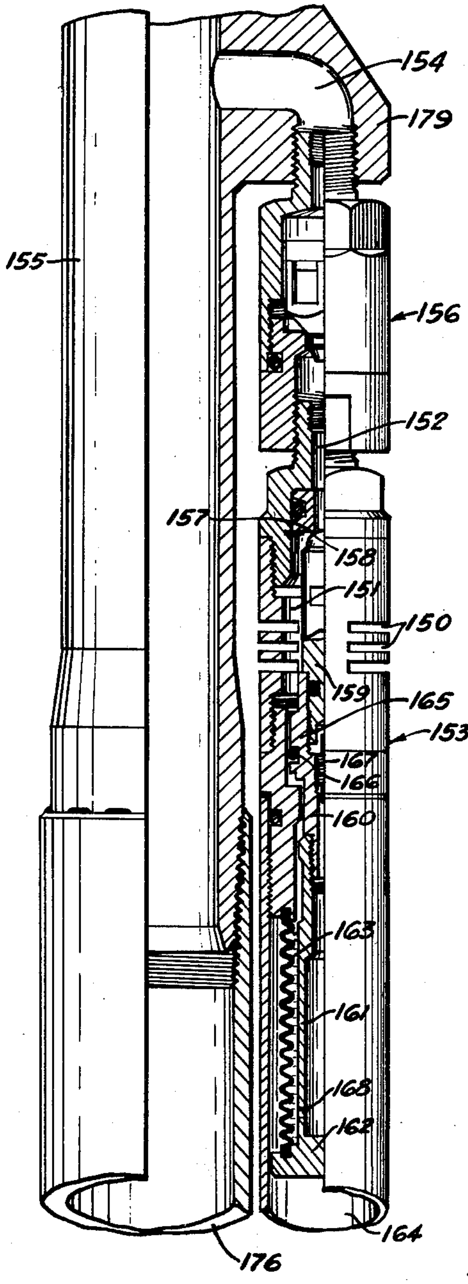
FIGS. 7A and 7B are detail views illustrating another embodiment of the improved valves of this invention useful not only in its systems illustrated in FIGS. 2 and 3, but also as gas lift valves as illustrated in FIG. 1, it being understood that FIG. 7A is a continuation of FIG. 7B, the latter being the lower portion of the valve.
Figure 7B:
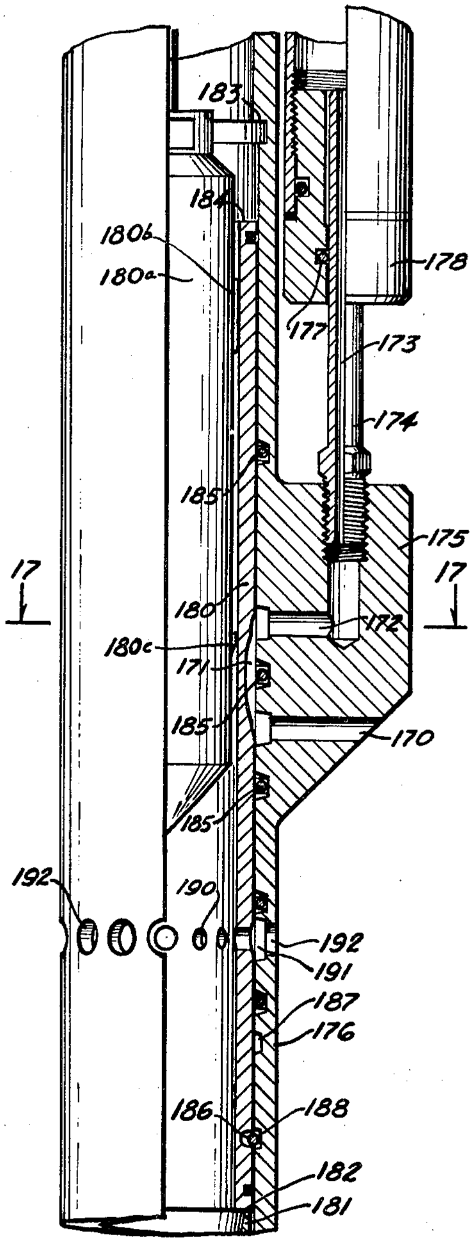

Valve means are provided for controlling flow through the passage between the interior of the charge chamber and the exterior of the valve and while there are a number of different ways such valve means can be provided, a preferrred way is shown in FIG. 7B. In this figure, passage portion 171 is disposed in a sleeve 180 which is shiftable to bring such portion into and out of register with one of passage portions 170 and 172. Thus, the sleeve is shown in FIG. 7B in a lowermost position with passage portion 171 therein in register and bridging across spaced apart passage portions 170 and 172. Further downward movement of the sleeve is prevented by stop part 181 positioned to engage lower end 182 of the sleeve. Suitable seals, such as O-rings 185 are positioned to provide a sliding seal between the sleeve and mandrel or tubing section 176. The upper and lower seals are spaced apart sufficiently to prevent fluid from passage portions 170 or 172 from flowing along the adjacent surfaces of the sleeve and mandrel section 176 into the interior of the mandrel section. Upon upward shifting of the sleeve, passage portion 171 will be moved upwardly until it lies between the upper seal 185 and the middle seal 185 so that the middle seal prevents flow between passage portions 170 and 172. Another stop part 183 is provided to abut upper end 184 of the sleeve and limit upward movement thereof. Suitable means, such as snap ring 186 which cooperates with spaced apart grooves 187 and 188, can be provided to releasably retain the sleeve in its upper and lower positions.

Means are provided for shifting the sleeve under a control exercised at the earth's surface. As shown in FIG. 7B, such means can include a suitable wire line tool **180*a* having an upper dog 180*b* adapted to engage the upper end 184 of the sleeve and a dog 180*c* for engaging the lower end of the sleeve. The tool is so constructed that it can be lowered on a wire line through the tubing with upper dog 180*b* retracted and lower dog 180*c* biased outwardly. The tool is lowered until dog 180*c* engages the lower end of the sleeve and then an upward pull on the wire line will move the sleeve to closed position after which the mounting for the lower dog shears permitting the lower dog to be retracted. If the sleeve is in its upper or closed position and it is desired to be moved to open position, the lower dog is engaged with the lower end of the sleeve, its mounting sheared to retract the lower dog which releases the upper dog for engagement with upper end 184** of the sleeve. Downward force is applied, as by jarring, to move the sleeve to open position. A more detailed description of this shifting tool will be found in copending application Serial Number 330,294, filed January 8, 1953.

Elements 155 and 176 have been termed above as "tubing or mandrel sections." It is contemplated that while these sections can be conventional tubing having lugs 175 and 179 connected thereto, they will actually be fabricated as a mandrel providing threaded upper and lower ends (not shown) for connection as a part of a tubing string. The mandrel thus formed will also include lugs 175 and 179, sleeve 180 and the various ports and passages in the mandrel sections, sleeve and lugs. Such an assembly will find general usefulness where it is desired to control flow of fluid between two points both of which are exterior of the tubing and mandrel wherein the control is to be effected by a manipulation (e.g. wire line operation) occurring within the tubing and mandrel.

In the general operation of the valve shown in FIGS. 7A and 7B, fluid exteriorly of the valve acts through ports 150 on piston 165 to urge valve member 158 toward open position in opposition to the force exerted by the pressure in charge chamber 164. When the exterior fluid is of a pressure of sufficient magnitude, the valve will open and permit flow into the mandrel and tubing string. When it is desired to change the operating characteristics of the valve, tool **180*a* can be lowered through the tubing and sleeve 180 shifted to open position as shown in FIG. 7B. The pressure exteriorly of the valve can then be adjusted by manipulation of valves at the surface of the well to be equal to the control pressure desired in the charge chamber. Sleeve 180** is then moved to closed position to retain the desired charge in the valve.

Figure 8:
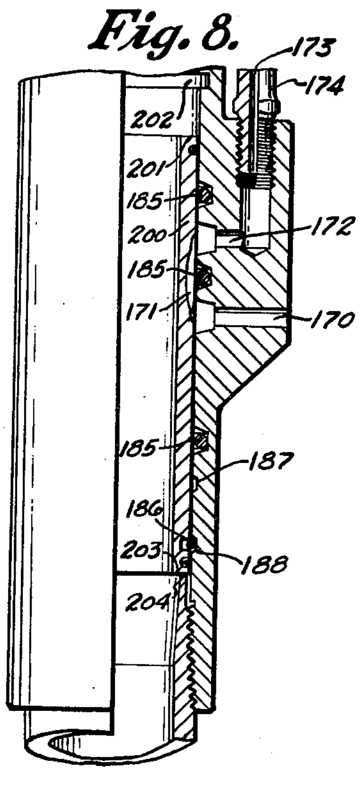
FIGS. 8, 9 and 10 illustrate alternative forms for the structure shown in FIG. 7B and can be substituted therefor.
Figure 9:
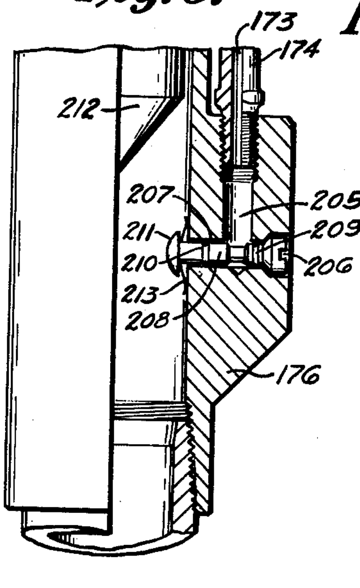
Figure 10:
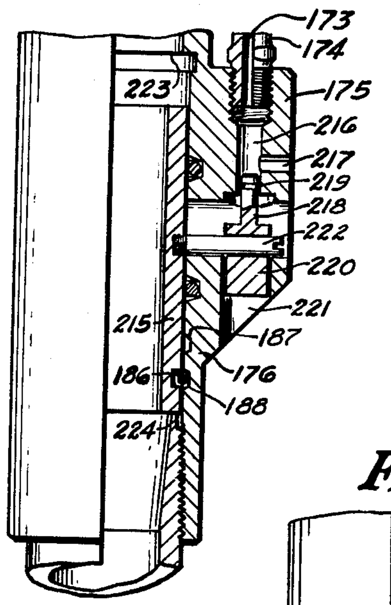

Turning now to FIGS. 8, 9 and 10, various alternative arrangements are shown for the valve controlling flow between charge chamber 164 and the exterior of the tubing. Thus, in FIG. 8, the arrangement is quite similar to FIG. 7B except that sleeve 200 is not provided with ports 190 as is sleeve 180 in FIG. 7B. Here again the sleeve's upper end 201 is adapted to about a shoulder 202 to limit movement of the sleeve upon reaching its closed position where passage portion 171 will be positioned upwardly of the middle seal 185. The sleeve, when in open position as shown in FIG. 8, abuts its lower end 203 against a shoulder 204 to limit downward movement. The embodiment in FIG. 8 has the advantage over that of FIG. 7B of not establishing communication between the exterior and interior of the tubing each time the charge chamber of the valve is opened for the application of exterior pressure thereto. One realization of this advantage occurs upon installation of valves of this type as gas lift valves and then being able to charge them at various pressures after the tubing-casing annulus has been dumped without injecting unnecessary amounts of lifting gas into the tubing during the charging operation.

In the arrangement of FIG. 9, passage portion 173 in connector piece 174 is placed in fluid communication with the exterior pressure via passage 205 and port 206. A lateral bore 207 extends from an inner wall of mandrel section 176 to port 206 in order to receive a valve member, here shown in the form of a piston 208 reciprocally mounted in this bore. The piston is formed with a seal 209 adapted to be positioned in a portion of bore 207 intermediate passage 205 and port 206 so that with the piston in its innermost position, flow through the passage 205 and port 206 is blocked. An inner seal 210 can also be provided to prevent leakage into the interior of the tubing or mandrel section from either of passage 205 or port 206. The inner end of the piston is formed with a part 211 for engagement with a tool 212 and urged outwardly thereby to unseat piston 208 and seal 209 and permit flow between port 206 and passage portion 205. A resilient means, such as a leaf spring 213, is provided to urge piston 208 inwardly toward closed position. Hence, upon lowering of tool 212, as by a wire line, into the interior of mandrel section 176, the tool will push the piston outwardly to unseated position and upon removal of the tool, spring 213 will move the piston to seated position. The structure of FIG. 9 has the advantage of not requiring a special tool for operating the valve means permitting flow between the charge chamber and exterior thereof. It has the disadvantage that many wire line tools, such as a pressure bomb, being lowered through the tubing for various purposes may accidentally cause piston 208 to be moved to unseated position as the tool passes part 211, thereby inadvertently permitting a change in the charge pressure of the valve.

In FIG. 10 there is shown still another arrangement in which a sleeve 215 is disposed in mandrel part 176 to be shifted between two positions in a manner similar to sleeve 200 in FIG. 8. Passage portions 216 and 217 are provided in lug 175 to communicate between the passage portion 173 in connector piece 174 and the exterior of the mandrel. Piston 218 is disposed to reciprocate in the passage portion 216 so that sliding seal 219 is alternately positioned above and below passage portion 217 to open and close the same to passage portions 216 and 173. One end 220 of piston 218 can be received in a bore 221 in order to maintain the upper end of piston 218 in proper alignment with passage portion 216. A force transmitting connection, such as pin 222, extends between the piston and the sleeve so that upon shifting of the sleeve, piston 218 and seal 219 are shifted between open and closed positions. Here again the sleeve is provided with upper and lower stops 223 and 224 to limit movement of the sleeve between open and closed positions.

It will be understood that the embodiments of FIGS. 8, 9 and 10 are exemplary of valve arrangements which can be substituted for the structure shown in the lower portion of 7B for combination with the structure shown in FIG. 7A or for combination with other valve arrangements (not shown) wherein a normally closed charge chamber is to have its pressure changed by the application of an external fluid pressure thereto and then to be isolated from such fluid pressure during normal operation of the valve.

Figures 11A, 11B:
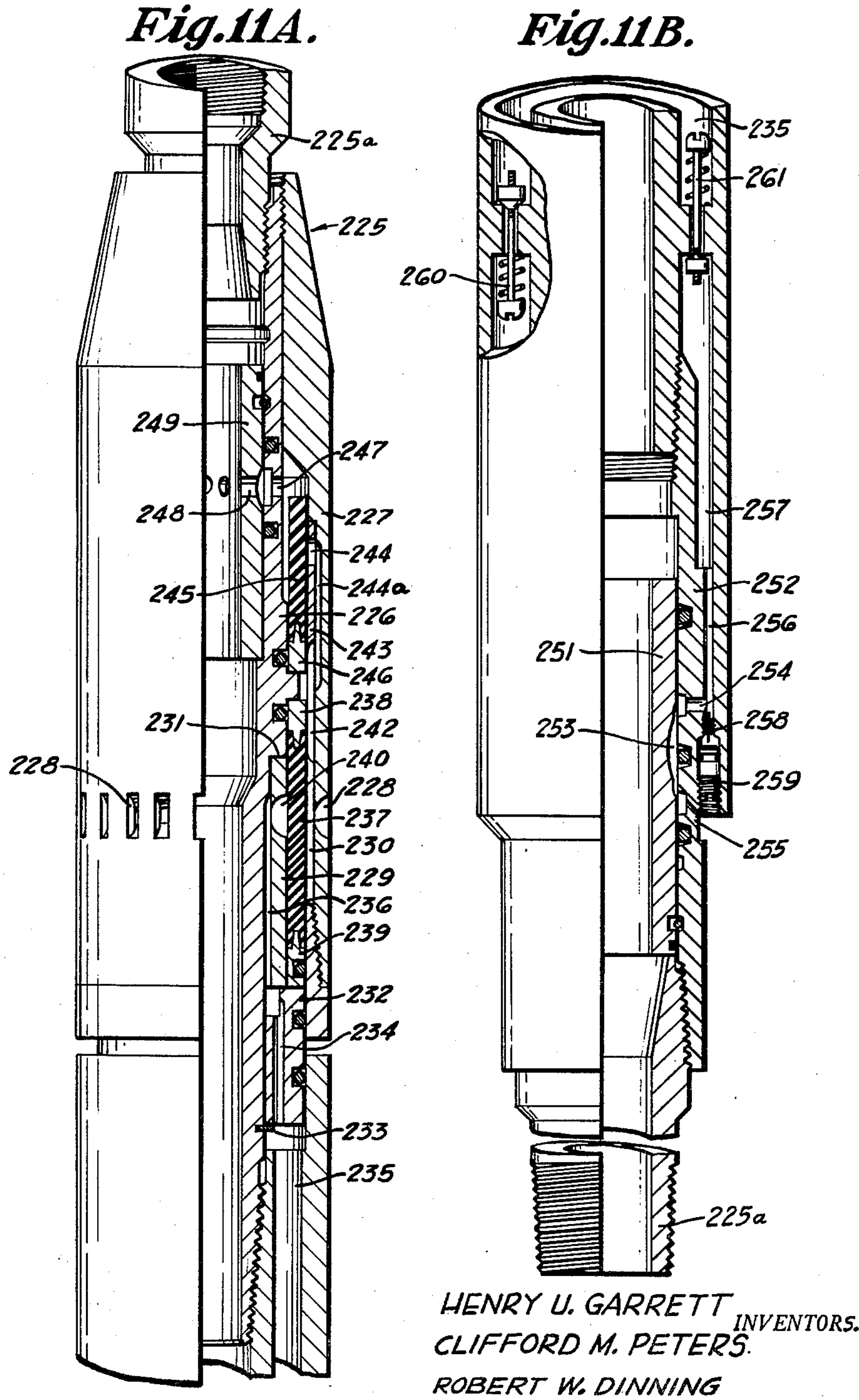
FIGS. 11A and 11B illustrate another type of valve adaptable for use in either the system of FIGS. 2 and 3 or as a gas lift valve as shown in FIG. 1.

In FIGS. 11A and 11B, there is shown still another embodiment of a pressure charged type of valve incorporating certain improvements of this invention. Thus, referring to these figures, there is provided a valve housing 225 including an inner housing part 226 adapted for connection into a well conduit by means of adapters 225*a*. Disposed around housing part 226 is an outer sleeve 227 having inlet ports 228 leading into an annular chamber 230 defined by an inner sleeve 229 and outer sleeve 227. Inner sleeve 229 can be maintained in place by abutting one end against a shoulder 31 on inner housing part 226 and the other end against an annular piece 232 disposed around inner housing part 226 and maintained in its proper position by a snap ring 233. Annular piece 232 has one or more bores 234 communicating between a charge chamber 235 and a longitudinal groove 236 in the outer circumference of inner housing part 226 next to inner sleeve 229.

Disposed in chamber 230 is a valve member made of resilient material, such as rubber, which is illustrated as an annular sleeve 237. The upper and lower ends of the sleeve are sealingly connected to retaining rings 238 and 239 so that pressure applied from charge chamber 235 through bore 234, groove 236 and port 240 in inner sleeve 229, is confined by resilient sleeve 237 and the pressure of such fluid urges the sleeve to be expanded and bridge across inlet port 228 so as to prevent flow through the same.

One way flow through inlet port 228 is provided by communicating it through interconnecting groove 242 in annular check valve sleeve 243 and groove 244*a* in outer sleeve 227 with a check valve port 244. Another resilient sleeve 245, of rubber or the like, is positioned to bridge across port 244 and prevent reverse flow therethrough. Thus sleeve 245 has one end fixed as by being connected to a retaining ring 246 while the other end is free to move toward and away from check valve port 244 under the influence of pressure applied thereto. The sleeve is shaped so that in the absence of pressure, it will lie across port 244. With such construction, fluid is free to flow from port 244 to port 247 and thence through port 248 in valve sleeve 249 since the pressure of the fluid in port 244 can press resilient sleeve 245 inwardly to establish communication with port 247. On the other hand, flow in a reverse direction is prevented since pressure interiorly of sleeve 245 will press it outwardly to bridge across port 244 and thus prevent back flow.

With the above arrangement, it will be apparent that the charge pressure in chamber 235 urges resilient sleeve 237 outwardly across port 228 until the pressure exerted through port 228 is sufficient to overcome the pressure of the charge and flex the sleeve inwardly. Thereafter, fluid is free to flow from port 228 through grooves 242 and 244*a* and port 247 to the interior of the valve.

Valve sleeve 249 is shiftable in the valve housing in the same manner as described with respect to the other similarly disposed sleeves described herein; thus shifting of this sleeve moves port 248 into and out of register with port 247. When the ports are out of register, flow through the valve is prevented irrespective of the application of pressure through port 228. Valve sleeve 249 can be moved between its open and closed positions by any suitable tool.

Means are also provided for changing the charge in chamber 235 while the valve is disposed in a well. Thus charging sleeve 251 is shiftably mounted interiorly of an extension 252 of inner housing part 226 and has disposed therein a passageway portion 253 adapted to bridge between and connect passage portions 254 and 255. Portion 254 is connected by bore 256 to a chamber 257, all of which can be termed a reservoir chamber. As it is shown in FIG. 11B, charging sleeve 251 is in open position so that pressure exteriorly of the valve is free to flow into or out of the reservoir chamber and hence into and out of charge chamber 235. Upon shifting the charging sleeve upwardly to closed position, passage portion 253 is moved to be out of register with passage portion 255, thereby closing the reservoir and charge chambers against the application of pressure of fluid exteriorly of the valve.

A pre-charging means for the reservoir and charge chambers can be provided to permit these chambers to be precharged while the valve is at the surface of the earth so that upon lowering of the valve into its appointed position in the well and opening these chambers to the pressure of a well fluid, intrusion of the latter into the chambers can be at a minimum. Thus, a check valve 258 permits charging of chambers 235 and 257 with a fluid under pressure when sleeve 251 is in its closed position. A sealing plug 259 can be disposed to assure against leakage should valve 258 not function properly. With such arrangement, chambers 257 and 235 can be charged to an elevated pressure at the surface of the earth and then the valve made up into the tubing and lowered into the well. When the valve has been located in its operating environment, which will usually be under a substantially elevated pressure, charging sleeve 251 can be moved to open position and the pressure in chamber 257 equalized with that exteriorly of the valve. Since the chamber 257 can be initially charged to be at a pressure of the order of that anticipated at the operating level of the valve in the well, flow of well fluid into chamber 257 can thus be limited to a relatively small amount as compared to the case where the valve is lowered into the valve with the pressure in chamber 257 at atmospheric. This pre-charging feature permits the volume of chambers 235 and 237 to be of a reasonably small size and yet to prevent well fluids from interfering with the operation of valve member 237.

Spring loaded check valves 260 and 261 can be employed to control flow between chambers 235 and 257 in the same manner as described for the check valves 42 and 43 in FIG. 3. In the event the check valves are employed, it is not essential that charging sleeve 251 also be employed since passage portion 255 can be eliminated and valve 258 and plug 259 substituted by an arrangement similar to that shown in FIG. 5D. Alternatively, bore 256 can be left open to the exterior of the valve if the pre-charging feature is not to be employed. However, by employing both charging sleeve 251 and check valves 260 and 261, charge chamber 235 can have its pressure changed either under the sole control of the casing pressure (by always leaving sleeve 251 open) or under wire line control by moving sleeve 251 between open and closed positions. Additionally, the use of the sleeve instead of the structure shown in FIG. 5D to permit pre-charging of chamber 257 allows this chamber to be charged at a relatively high pressure and one which is known to be considerably in excess of any well pressure likely to be encountered. Then upon moving sleeve 251 to open position after the valve has been situated in the well, one can always be assured that reservoir 257 will be completely filled with the pre-charged fluid at least at the start of the operations. This advantage is particularly desirable where the pressures likely to be encountered in the well are not known.

Figure 12A:
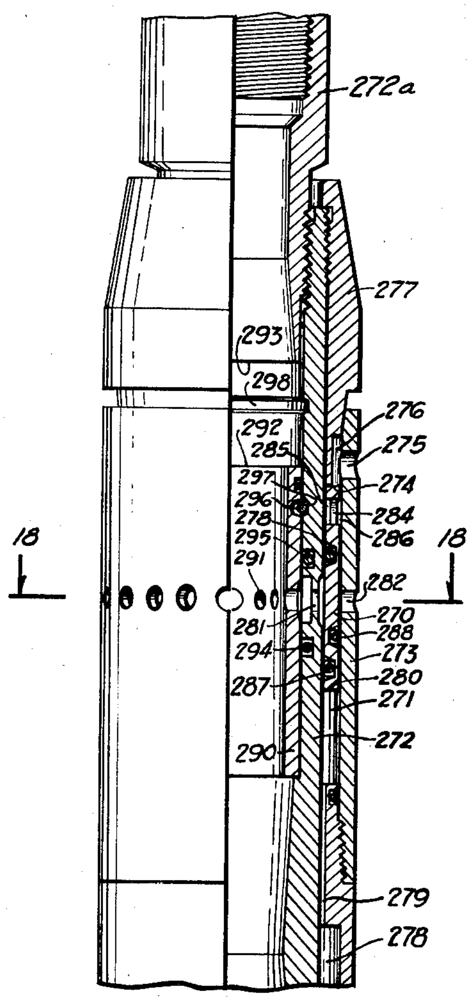
FIGS. 12A and 12B illustrate an embodiment of another improved valve of this invention.
Figure 12B:
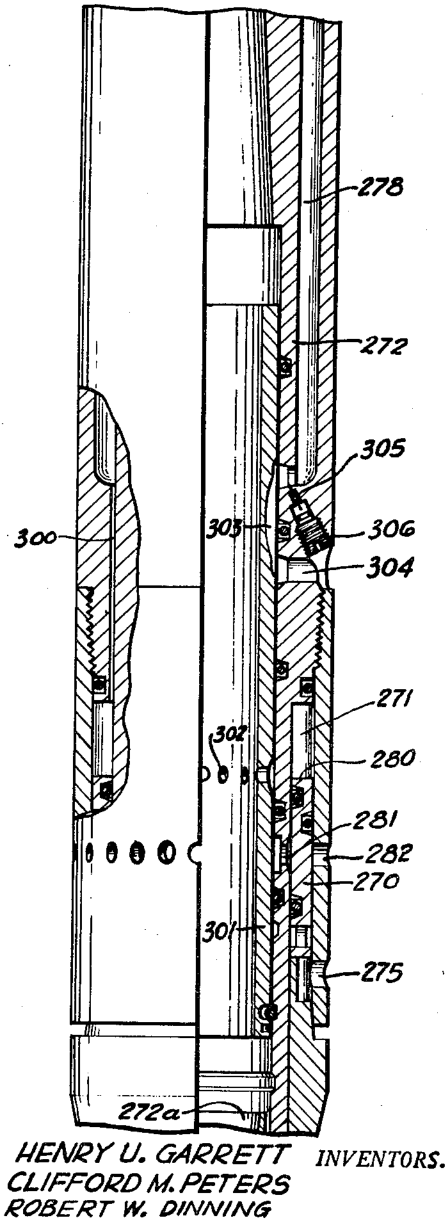

Referring to FIGS. 12A and 12B, there is shown one embodiment of a valve in which a piston is employed as a pressure responsive member to control opening and closing of a valve member responsive to pressure applied to the piston to urge it in at least one of its reciprocatory movements in a cylinder. Such pressure can be derived from the fluid whose flow is controlled by the valve member or from a fluid in a normally closed charge chamber and in a preferred embodiment of the valve, opposite ends of the piston are exposed respectively to the pressure of these two fluids. Thus, in a preferred form of this valve, annular piston 270 is reciprocally disposed in a cylinder 271 defined by an inner valve body part 272 and an outer sleeve 273. For the embodiment shown in FIG. 12A, piston 270 is moved responsive to pressure applied to end 274 thereof from the exterior of the valve body through port 275 and annulus 276 in a retainer sleeve 277. A seal, such as O-ring 278, can be provided between the inner circumference of sleeve 270 and valve body part 272 to prevent fluid from port 275 leaking into the interior of the valve body.

Resilient means are provided for urging piston 270 in a direction opposite to that which it is urged by pressure acting through port 275 on piston end 274. Thus, piston 270 can define with the valve body a variable volume normally closed pressure chamber comprising charge chamber 278, interconnecting passage 279 and a portion of cylinder 271 intermediate end 280 of piston 270 and passage 279. The variable volume pressure chamber is adapted to receive a charge of resilient fluid (gas or gas plus liquid) which acts against end 280 of the piston to urge it toward valve closing position.

While piston 270 can be connected to a valve member which seats in a port or seat to control flow through the valve similar to valve member 69 and seat 68 in FIG. 5A, it is preferred to provide an arrangement of registering ports or passages such as will eliminate the necessity for mating seating surfaces such as those shown to exist on valve member 69 and seat 68 in FIG. 5A. Thus, inner and outer ports 281 and 282 are respectively provided in valve body part 272 and in outer sleeve 273. Other ports 284 are situated in piston 270 in such position that they are adapted to be moved into and out of register with ports 281 and 282 as the piston is reciprocated in cylinder 271 between its open and closed positions. Circumferential grooves 285 and 286 can also be arranged to assure that ports 284 will communicate with ports 281 and 282 despite lack of radial orientation of ports 284 with the inner and outer ports. With this construction and as the pressure exerted through port 275 on end 274 of the piston increases to move the piston into cylinder 271 against the pressure in charge chamber 278, ports 284 will be brought into register with inner and outer ports 281 and 282 so that flow can take place between the interior and exterior of the valve body. Then, upon a suitable decrease in the pressure applied through port 275, the piston can move to closed position under the influence of pressure in the charge chamber to move ports 284 out of register with the inner and outer ports and also to move an imperforate portion of the piston across at least one of the inner and outer ports to block flow therethrough. Thus not only is there provided a flow passageway through the valve body but also a valve means controlling flow through such passageway and, in the illustrated embodiment, a portion of the valve means (ports 281 and the flow blocking imperforate portion of the piston) are incorporated in the piston itself so that it serves not only as a pressure responsive member but also as a part of the valve means. The above described arrangement of the valve means does not require the mating together of seating surfaces but instead only a relative sliding movement between the flow controlling valve elements. Further, by providing seals, such as O-rings 287 and 288, on opposite sides of piston 270 between port 282 and the charge chamber, leakage of fluid between the charge chamber and the various ports is prevented so that the piston can be constructed to have an appreciable clearance with the walls of cylinder 271. Accordingly, the need for accurately machined and aligned surfaces, such as between two mating seating parts, is eliminated. Also, any erosion of the walls of ports 281, 282 and 284 does not result in leakage when the valve is closed as would be the case with erosion of mating seating surfaces.

In the illustrated embodiment, the effective areas (ends) of piston 270 exposed to the pressure of the control fluid and to the charge pressure are the only areas on the piston effective to urge it in either of its directions of movement so that the piston is not affected in its movement by pressure applied through ports 281 or 282. Since piston ports 284 are disposed to communicate between one lateral circumferential wall portion of the piston and another such portion, any pressure fluid within these ports is rendered ineffective to exert any net force urging the piston in either direction. Hence, when the piston is in open position, flow through or pressure within ports 284 of the controlled passageway is without effect on the movement of the piston since it will act upon the oppositely facing but equal areas of the walls of this port. On the other hand, when the piston is moved to closed position, pressure from ports 281 and 282 merely acts inwardly on lateral wall portions of the piston disposed across these ports and hence cannot urge it longitudinally toward open or closed positions. As a result, the valve of FIGS. 12A and 12B is sensitive only to pressure exteriorly thereof in its opening and closing movements and the pressure internally of the valve neither effects the opening nor closing thereof.

As shown in FIGS. 12A and 12B, the preferred form of the valve involves making piston 270 annular in shape and disposing it in a cylinder which is situated laterally of and around an inner bore through the valve body. Then, by inserting the valve body coaxially in a tubing or well conduit to be a part thereof as by adapters 272*a*, the bore through the valve body becomes a part of the flow passage through the conduit and can be made large enough to accommodate well tools lowered through the conduit. With this arrangement, the valve does not interfere with wire line or other operations being conducted in the well conduit and neither does it require substantial enlargement of the well bore to accommodate the valve as is the case where valves are conventionally mounted on a lug offset from the well conduit.

As still another feature of this 'full-opening bore" arrangement, outlet ports 281 of the valve can be arranged to direct streams of fluid to impinge on each other interiorly of the valve body so that the fluid streams will dissipate their energy through such impingement rather than by impinging themselves against an inner metal surface on the valve body. As a result, erosion of the valve body can be substantially reduced.

In order to control flow of fluid into and out of the valve body independently of the pressure responsive valve described above, a separate valve can be provided in series with the pressure responsive valve. Thus, sleeve 290 can be shiftably mounted within valve body part 272 to move ports 291 in the sleeve into and out of register with ports 281. Thus when the sleeve is shifted upwardly so that its upper end 292 abuts an upper shoulder 293, ports 281 are blanked off and flow through the pressure responsive valve is prevented irrespective of the pressure applied through port 275. Seals, such as O-rings 294 and 295, are provided to either side of port 281 so as to prevent leakage between the sleeve and the bore of valve body part 272. Of course, when sleeve 290 is employed, ports 291 therein can be arranged to direct fluid streams flowing therethrough to impinge upon each other as described above for ports 281. Also, a snap ring 296 can be provided to releasably retain the sleeve in its upper and lower positions by alternate engagement with grooves 297 and 298.

Sleeve 290 can be shifted between its two positions by any adequate tool such as the one shown in FIG. 7B.

A second pressure responsive valve can also be incorporated in the valve body as illustrated in FIG. 12B and to be served by a charge chamber common to both of such valves. The arrangement is such as to permit selective and alternate operation of the valves or their operation in parallel. Since the construction of the lower pressure responsive valve as illustrated in this drawing is the same as that in FIG. 12A, the corresponding parts have been given like numbers. Communication between end 280 of the piston of this valve with the common charge chamber 278 is provided by a bore 300.

Control of flow through the lower valve of FIG. 12B can be prevented irrespective of whether this lower valve is in open or closed position by means of a sleeve 301 which also can be arranged to control the application of a well pressure to charge chamber 278 in order to change the pressure therein and hence change the operating characteristics of both the upper and lower pressure responsive valves. Thus, the sleeve is disposed in body part 272 to be shifted between an upper, a lower and an intermediate position. In one such position (e.g. lower), ports 302 of the sleeve are in register with ports 281 so that upon movement of piston 270 upwardly, flow can take place through the lower pressure responsive valve thereby permitting it to be placed in operation separately from the upper pressure responsive valve or in parallel therewith as may be desirable when large volumes of fluid are to pass into the tubing. In another position of the sleeve (e.g. uppermost), ports 302 are moved to be out of register with ports 281 so that the lower pressure responsive valve is rendered ineffective to admit fluid into the valve body thereby permitting sleeve 290 to be shifted to place the upper valve in operation by itself. At still another position (e.g. intermediate), ports 302 are again out of register with ports 281 but passage portion 303 is positioned to bridge between charge chamber 278 and passage portion 304 leading to the exterior of the valve. Thus with the sleeve in this position, the pressure exteriorly of the valve can be manipulated to cause a corresponding pressure to exist in the charge chamber after which sleeve 301 can be moved to its upper or lower positions to retain the charge in the chamber. Also, a check valve 305 is provided to permit pre-charging of chamber 278 while the valve is at the surface of the well for realizing the advantages explained above in connection with the similar arrangement of FIGS. 11A and 11B. Here again, a seal plug 306 can be provided to prevent possible leakage from the charge chamber.

Figure 13:
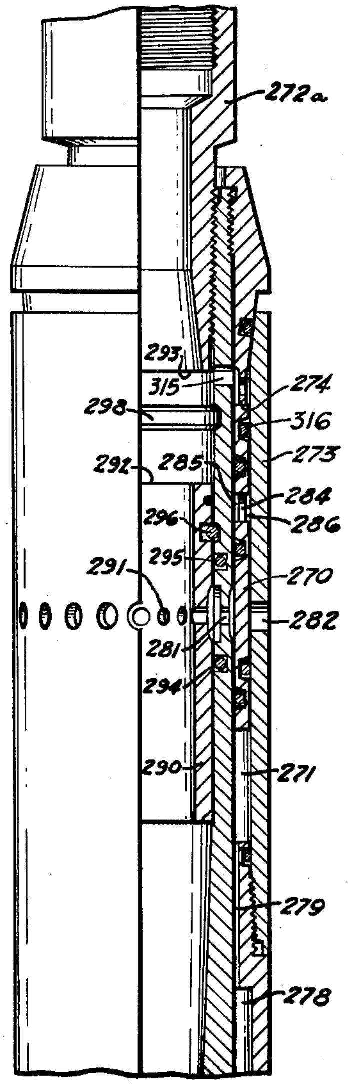
FIG. 13 illustrates another form for the portion of the valve shown in FIG. 12A which is usable with the portion shown in FIG. 12B.

Referring to FIG. 13, an arrangement quite similar to that in FIG. 12A is illustrated except that the valve is made sensitive to the pressure interiorly thereof (tubing pressure) by providing port 315 to apply pressure interiorly of the tubing string against end 274 of piston 270. Thus this valve becomes a "fluid operated" valve sensitive to tubing pressure. An additional seal, such as O-ring 316, can be installed in the piston to prevent passage of fluid between the piston and outer sleeve 273.

It will be understood that the valve of FIG. 13 is to be employed with a charge chamber arrangement as described for the valve of FIGS. 12A and 12B. Further, the valves of FIGS. 12A, 12B and 13 can be employed singly by eliminating either the upper or lower pressure responsive valve shown in FIGS. 12A and 12B.

Any of the valves illustrated in FIGS. 7A to 12B, inclusive, can be employed in the system of this invention by installing them so that their inlet ports are submerged in the formation fluid and so that they control flow from the formation through a well conduit. For example, any of the valves can be installed as at 310 in FIG. 1 to be below a packer 14. Such packer need not always be employed but is often desirable for many reasons, such as when gas lift valves are to be installed in the well. When the packer is employed, a valve similar to valve 44 of FIG. 3 can be situated below the packer to permit bleeding down of the formation as described with reference to FIG. 3. However, when using a charging sleeve, such as sleeve 180 in FIG. 7B, the sleeve 180 can be provided with a plurality of ports 190 which, upon movement of the sleeve to open position, are in fluid communication with an annular groove 191 which in turn communicates with the exterior of mandrel section 176 through a plurality of ports 192. This arrangement, when the valve is mounted on a tubing below a packer, permits the bottom hole pressure to be bled down in the same manner as described with respect to valve 44 in FIG. 3. Thus, the shifting of a single sleeve not only opens the charge chamber of the pressure charged valve to the formation pressure but also opens the tubing to the formation permitting the formation pressure to be bled down through the tubing. The charging sleeves of the other valve embodiments can be provided with similarly arranged ports for the above described purpose.

As above stated, the improved valves of this invention as illustrated in FIGS. 5A to 13, inclusive, can also be used as gas lift valves or for other well operations in which fluid flow between two conduits (e.g. tubing and casing) is to be controlled. Thus in FIG. 1, different ones of the valves are shown installed on a tubing 12 to indicate a gas lift system. Obviously, the valves can all be of the same construction or different from each other. In this figure, valve 311 is of the type shown in FIGS. 7A–7B, valve 312 as in FIGS. 11A–11B and valve 313 as in FIGS. 12A–12B. In any event, the casing pressure can be manipulated increasing or decreasing it via line 17 and control valve 18 to change the charge pressure of the valves while they are situated in the well. Thus, in the case of the embodiment shown in FIGS. 5A–5E, the valve can be connected to a mandrel by screwing threads 61 into a lug on the mandrel which has a passage from the mandrel interior leading to port 64. Then by increasing the casing pressure, piston 123 can be unseated if not previously moved to such position by the already existing well pressures. The casing pressure is then free to act on the charge in reservoir 83 to cause fluid to flow into or out of charge chamber 73. In the installation of valves of this type as dumping valves, springs 110 can be quite weak so that the charge pressure of the dumping valves can be easily raised, by raising the casing pressure, to a high value substantially exceeding the upper limit of an expected operating range of pressures to be employed in the casing to control the working valve. Then by making spring 111 of sufficiently great strength that it will maintain valve member 100 seated across port 81 until the casing pressure falls considerably below the lower limit of the operating range, the dumping valves will remain charged at their original high pressure and will remain closed even though the casing pressure fluctuates throughout said operating range. Such an arrangement prevents dumping valve interference when the casing pressure fluctuates and by providing said operating range to have broad limits, even abnormal casing pressure fluctuations cannot open the dumping valves.

Further, it is possible to make springs 110 and 111 of the dumping valves of such strength relative to those of the working valve that the dumping valves can be charged and maintained, after dumping, at a relatively high charge pressure while the working valve is charged to a somewhat lower pressure. The operating valve can thus be set to operate at a relatively high casing pressure and the dumping valves charged, after the well has been dumped, to a pressure such that they will not open at the operating casing pressure. In this manner, relatively high injection pressures can be provided for the working valve irrespective of the casing pressures existing during dumping of the well.

The improved valves of this invention employing charging sleeves or the like controllable by a wire line operation, such as the valves shown in FIGS. 7A to 13, inclusive, can be installed as working valves to permit a greater flexibility of the gas lifting operation. Thus, a number of these valves can be installed at various levels at which it is contemplated working valves may be desired during extended operation of the well in order to accommodate changing well conditions.

When one or more of the working valves have ports in their charging sleeves such as ports 190 as shown in FIGS. 7A and 7B, it will be possible to move the sleeve to open the ports and then to unload the tubing-casing annulus by pressuring fluid therefrom into the tubing through such ports. As is best shown in FIG. 1, a plurality of these valves can be mounted on the tubing and the sleeves of all of them shifted to open position. Pressure is then applied through pipe 17 to the tubing-casing annulus to cause liquid therein to be U-tubed upwardly through the tubing and thence out through line 15. As a fluid level falls in the tubing-casing annulus to uncover the uppermost port 192 of the string of valves, gas will flow through ports 190 and 192 into the tubing to gas lift the fluid thereabove out of the tubing. At the same time, such gas applies its pressure to the interior of the charge chamber and maintains the flow control valve in closed position. Sleeve 180 of such valve can be closed after the fluid thereabove has been gas lifted from the tubing. The flow control valve will remain in closed position. This operation can continue until the liquid in the tubing-casing annulus has been dumped to a desired level therein and the desired working valve uncovered. The selected one of the working valves can then be set at any desired charge pressure by manipulating its charging sleeve (e.g. sleeve 180, FIG. 7B) and adjusting the casing pressure to the desired charge pressure and then closing the charging sleeve. The other working valves on the tubing can have their sleeves moved to open position and the casing pressure raised to a higher value than is anticipated will be used in operating the selected working valve. Upon closing of the sleeves of these other working valves, it will be appreciated that they will each have a charge pressure sufficiently high to maintain the valve seated during subsequent operation of the well. The selected working valve can then be operated at a pressure corresponding to its charge pressure. Such an arrangement permits the use of almost any casing pressure to gas lift the well without interference from other working valves on the tubing. It also means that the operating casing pressure can be regulated to be considerably higher or lower than that employed to dump the well. Further, the annulus pressure can vary over a wide range without causing any other valve in the string to open or close and interfere with the proper gas lifting operation. Also, the spacing between the valves can be increased over that normally employed with conventional pressure charged valves. If during subsequent operation of the well it is desired to shift the gas injection point to another working valve, the newly selected valve is charged to the desired pressure and the other valves to a higher pressure as above. Thus, there is provided considerable flexibility not only in injection pressures but also in injection points or levels.

It is contemplated that the pre-charging mechanism illustrated in FIGS. 5D and 5E can be used in combination with the other valve arrangements of this invention by installing it between a source of exterior pressure and a chamber to which such exterior fluid pressure is to be applied. For example, the mechanism can be installed at any convenient point between charge chamber 164 in FIGS. 7A and 7B and the inlet to passage portion 170. This will permit the elimination of charging sleeve 180 as a control valve for charging chamber 164. Further, a pre-charging valve, such as valve 258 in FIG. 11B, can be installed, with or without a reservoir chamber to permit pre-charging of any of the other valves of this invention, particularly in combination with a well tool operated charging control mechanism such as with a charging sleeve 180 in FIG. 7B or with the various embodiments in FIGS. 8, 9 and 10.

Figure 14:
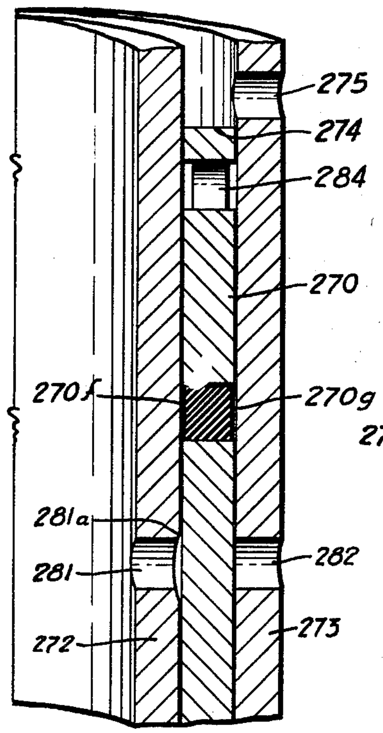
FIG. 14 is a partial cross-sectional view of the valve of FIG. 12A illustrating a novel type of sealing arrangement.
Figure 15:
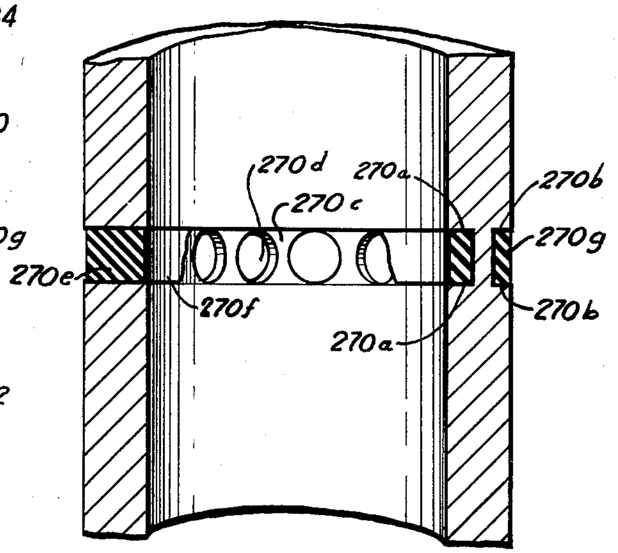
FIG. 15 is an isometric view, partially broken away and sectioned to illustrate the construction of the seal shown in FIG. 14.
Figure 18:
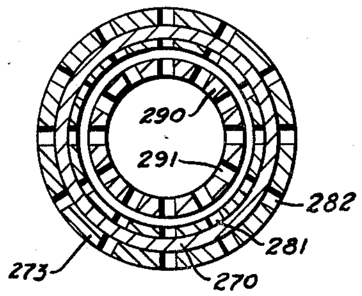
FIG. 18 is a cross-sectional view taken on the line 18—18 of FIG. 12A.
Figure 17:
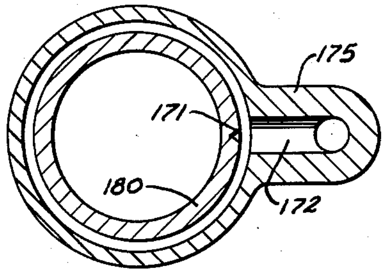
FIG. 17 is a view taken on the line 17—17 of FIG. 7B.
Figure 16:
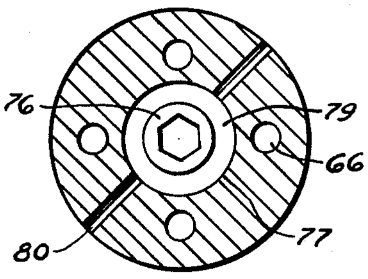
FIG. 16 is a cross-sectional view taken on the line 16—16 of FIG. 5A.

In the illustrated embodiments described above, O-rings have been shown as providing sliding seals between the sleeves and valve bodies in FIGS. 7A–7B, 8, 10, 11A–11B and 13, and between the valve pistons and valve bodies of FIGS. 12A and 12B. While O-rings are largely satisfactory in such installations, an improved seal is shown in FIGS. 14 and 15 which can be substituted for the O-rings in those instances where a fluid pressure is available which is higher than that existing between the surfaces which are to have the sliding seal disposed therebetween. Thus, for example, the improved seal is shown in FIGS. 14 and 15 as installed on valve piston 270 of the valve of FIG. 12A. The piston is provided with inner and outer circumferential grooves 270*a* and 270*b* so that the upper and lower piston portions remain connected by a web 270*c*. The web is provided with a plurality of openings or holes 270*d* which provide communication between the inner and outer grooves. The latter as well as holes 270*d* are filled with a body of rubber or other resilient material 270*e*, which is bonded at its upper and lower surfaces to the walls of the inner and outer grooves. With this construction, pressure applied to one of faces 270*f* or 270*g* will cause the rubber to transmit the pressure to the other face to urge it outwardly into sealing engagement with the metal surface parallel thereto. Thus, as shown in FIG. 14, pressure from ports 275 and 282 will be applied through the clearance between piston 270 and outer sleeve 273 to face 270*g* of the rubber. This urges inner face 270*f* into sealing engagement with the outer face of inner body part 272. It will be noted that though pressure from port 275 can be applied through the clearance between piston 270 and inner body part 272 to the upper edge of face 270*f*, lower pressure from port 281 is similarly applied to the lower edge of face 270*f*. As a result, a pressure drop will occur across face 270*f* so that at least a portion of the face is at a pressure less than that applied to outer face 270*g*. Accordingly, the rubber will flow into sealing engagement with the outer face of inner body part 272.

Since the upper and lower faces of the rubber body are bonded to the corresponding faces of grooves 270*a* and 270*b*, the upper and lower edges of face 270*f* cannot move outwardly to catch on or be pinched by the edges of port 281 or slot 281*a* even though the portion of face 270*f* intermediate its upper and lower edges bulges toward the outer face of inner body part 272 to effect a seal therewith. Hence, even though such intermediate portion of face 270*f* may protrude somewhat into port 281 as piston 270 moves the seal across such port, the upper and lower edges of the face are prevented from doing so. As a result, the edges of the port contact only a smooth curved surface of the seal thereby substantially eliminating any tendency to tear or pinch off the seal.

In a preferred form the rubber is so molded that when in an unflexed or unstressed state, faces 270*f* and 270*g* are spaced inwardly of the inner and outer faces of piston 270. This aids in assuring that the upper and lower edges of inner face 270*f* will not catch on the periphery of port 281 or slot 281*a*.

While the seal described above has been illustrated to be on a piston movable relative to a valve body, it can be installed in a valve body so as to permit the valve member, such as a charging sleeve or the like, to move relative thereto. For example, the seal can be installed in body 176 (FIG. 7B) to replace O-rings 185.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A system for regulating the flow of fluid from a producing formation of a well into a flow conduit in the well to maintain a selected back pressure on the formation which comprises, in combination, a flow conduit in said well having a passage disposed to provide fluid communication between said formation and a point interiorly of said conduit; and valve means carried by said conduit at a substantial depth in said well and including a first port and a valve member disposed to control flow through said passage, pressure responsive means connected to said valve member and having a part exposed to pressure of fluid flowing from said formation upstream of said first port and urged thereby to move said valve member toward port-opening position, the effective area of said pressure responsive means exposed to said upstream pressure being sufficiently large relative to any area of the valve means upon which pressure of fluid downstream of said first port acts to influence opening or closing of the valve means that movement of the valve member is controlled substantially only by said upstream pressure, said pressure responsive means including an enclosed charge chamber for a resilient fluid under pressure to urge said valve member toward port-closing position, a second port communicating between said chamber and the exterior thereof, a valve part controlling flow through said second port, pressure responsive means connected to said valve part to move it to and from closed position and exposed on one side to pressure of fluid in said chamber to be urged thereby in one direction and also being exposed on its other side to pressure of fluid exterior of said chamber to be urged thereby in the other direction so that opening and closing of said second port is controlled by the difference between said charge pressure and said exterior pressure, and resilient means urging the valve part toward closed position.

2. In a pressure charged valve adapted to be disposed at a substantial depth in a well to control flow of the fluid from a formation therein and having a body, a chamber therein charged with resilient fluid disposed to apply pressure to a valve closure member in opening and closing the valve, the combination therewith of first and second valves carried by the valve body disposed to control admission and exhaust of fluid from said chamber to vary the pressure therein; each of said first and second valves comprising a port communicating between said chamber and the exterior thereof, a valve part controlling flow through said port, pressure responsive means connected to said valve part to control opening and closing of said port, one of said pressure responsive means being exposed on one side to pressure in said chamber and urged thereby to port-closing position and the other of said pressure responsive means being exposed on one side to pressure in said chamber and urged thereby to port-opening position, and means, connected to said valve parts, for biasing said valve parts toward port-closing position with predetermined force, and maintaining said first and second valves closed until exterior pressure exceeds or falls below that in said chamber by an amount corresponding to said predetermined force whereupon the respective one of the valve parts moves to port opening position.

3. The valve of claim 2 wherein the effective area of each of said pressure responsive means is sufficiently large relative to the cross-sectional area of the respective ports that movement of the valve parts is controlled substantially solely by pressure acting on said pressure responsive means.

4. A system for regulating flow of fluid from a producing formation of a well and maintaining a selected back pressure on the formation which comprises, in combination, a flow conduit in said well having a passage disposed to provide fluid communication between said formation and a point in the interior of said conduit, valve means, carried by said conduit at a substantial depth in said well, having a port disposed to form a part of said passage and a valve-closure member disposed to control flow through said port and passage, fluid pressure-responsive means connected to said valve-closure member, said pressure-responsive means having a surface exposed to pressure fluid upstream of said port, the force of pressure upstream of said port urging the pressure-responsive means and the valve-closure member toward port-opening position, a closed charge chamber formed in part by another pressure actuable surface on said pressure-responsive means and fluid under super atmospheric pressure in said charge chamber urging said pressure-responsive means and valve member toward port-closing position, the area of said surface of said pressure-responsive means exposed to pressure fluid upstream of said port being much greater than the area of said port whereby a constant back pressure is maintained on said formation.

5. A system for regulating the flow of fluid from a producing formation of a well and maintaining a selected back pressure on the formation which comprises, in combination, a flow conduit disposed in the well and pressure-responsive valve means disposed in the well and controlling flow of well fluid from the formation through said conduit, said valve means including, a port, a valve member cooperable with said port to control flow therethrough, pressure-responsive means controlling movement of said valve member, means exposing a surface of said pressure-responsive means to pressure fluid upstream of said port, said upstream pressure fluid urging the pressure-responsive member toward port-opening position, a close charge chamber formed in part by another pressure actuable surface on said pressure responsive means, and fluid under super atmospheric pressure in said charge chamber urging the pressure-responsive means toward port-closing position.

6. A system for regulating the flow of fluid from a producing formation of a well and maintaining a selected back pressure on the formation which comprises in combination a flow conduit disposed in the well to conduct fluids from said formation to the surface of the earth; valve means in the well disposed to control flow from the formation through said conduit comprising a port, a valve member cooperable with the port to control flow therethrough, a normally closed pressure chamber including a pressure actuable surface of a pressure responsive means, a charge of fluid under pressure in said chamber, said pressure-responsive means connected to said valve member and urging the valve member toward closed position under the force of pressure in said chamber, means exposing another pressure actuable surface of said pressure-responsive means to pressure of fluid from said formation upstream of the port, the force of upstream pressure urging the pressure-responsive means against pressure of fluid in said chamber and toward port-opening position, said pressure-responsive means being responsive to an increase of said formation fluid pressure above a predetermined value to open the valve means and upon decrease of formation fluid pressure below a predetermined value to close the valve means, thereby maintaining a selected back pressure on said formation.

7. A system for regulating the flow of fluid from a producing formation of a well into a flow conduit in the well to maintain a selected back pressure on the formation which comprises, in combination, a flow conduit disposed in the well to conduct fluid from said formation to the surface of the earth; and pressure responsive valve means in the well controlling flow from the formation through said conduit and including a charge chamber, a charge of fluid under super atmospheric pressure in said chamber, said chamber formed in part by a fluid actuable surface of pressure-responsive means movable to open and close the valve means and urging the valve means toward closed position, said pressure-responsive means having another pressure actuable surface exposed to the pressure of fluid from said formation upstream of the valve means and urged thereby to open the valve means, and means normally isolating said pressure responsive means from the pressure of fluid downstream of the valve means so that opening and closing of said valve means is effectively controlled by said upstream pressure substantially independently of said downstream pressure.

8. A valve comprising, a valve seat, a first valve member cooperable with the seat to control flow therethrough, charge-chamber means including first pressure-responsive means, said first pressure-responsive means connected to and controlling movement of said first valve member, a port communicating between the interior and exterior of said charge chamber means, a second valve member controlling flow through said port, second pressure-responsive means providing a portion of said charge chamber means and connected to said second valve member, said second pressure-responsive means exposed on one side to pressure fluid exteriorly of said charge-chamber means, said second pressure responsive means actuating said second valve member for opening and closing said port responsive to differential pressure between said charge-chamber means pressure and said exterior fluid pressure, and resilient means urging the second valve means toward closed position.

9. The valve of claim 8 wherein the effective area of said second pressure-responsive means is substantially larger than the cross-sectional area of said port whereby movement of said second valve member is dominantly controlled by pressure acting on said second pressure-responsive means.

10. A valve comprising, a valve seat, a first valve member cooperable with the seat to control flow therethrough, charge chamber means including first pressure-responsive means, said first pressure-responsive means connected to and controlling movement of said first valve member, a reservoir, first port means between said charge chamber and said reservoir, a second valve member controlling flow through said port means, second pressure-responsive means connected to said second valve member and exposed on one side to pressure fluid in said charge chamber means and on the other side to pressure fluid in said reservoir, said second pressure-responsive means actuating said second valve member for opening and closing said first port responsive to a differential between said charge chamber means pressure and said reservoir pressure, resilient means urging the second valve means toward closed position, and valve means opening said reservoir to pressure fluid outside of the valve when pressure in the reservoir is less than the pressure outside the valve.

11. The valve of claim 10 wherein said valve means comprises a port communicating between the interior of the reservoir and the exterior of the reservoir, a valve element movable to open and close the last mentioned port and urged toward seated position by pressure interiorly of the reservoir and toward unseated position by pressure exteriorly of the reservoir whereby said last mentioned valve element remains seated to prevent ingress or egress of fluid from said reservoir until the pressure exteriorly thereof is increased to exceed a predetermined value, said valve element when unseated bing free to remain in unseated position.

12. The valve of claim 11 in combination with resilient means urging the valve element in controlling ingress or egress of fluid from said reservoir toward open position.

13. A valve comprising, a valve seat, a first valve member cooperable with the seat to control flow therethrough, charge-chamber means including first pressure-responsive means, said first pressure-responsive means connected to and controlling movement of said first valve member, a port communicating between the interior and exterior of said charge-chamber means, a second valve member controlling flow through said port, second pressure-responsive means providing a portion of said charge chamber means and connected to said second valve member, said second pressure-responsive means exposed on one side to pressure fluid exteriorly of said charge-chamber means, said second pressure-responsive means actuating said second valve member for opening and closing said port responsive to differential pressure between said charge-chamber means pressure and said exterior fluid pressure in which charge-chamber pressure is higher than exterior fluid pressure, first resilient means urging the second valve member toward closed position, a second port communicating between the interior and exterior of said charge-chamber means, a third valve member controlling flow through said second port, third pressure-responsive means providing a portion of said charge-chamber means and connected to said third valve member said third pressure-responsive means exposed on one side of pressure fluid exteriorly of said charge chamber means, said third pressure-responsive means actuating said third valve member for opening and closing said second port responsive to differential pressure between said charge-chamber means pressure and said exterior fluid pressure in which charge-chamber pressure is lower than exterior fluid pressure, and second resilient means urging the third valve member toward closed position.

14. In a pressure-responsive valve having a body with a normally closed charge chamber containing a charge of fluid under pressure, reservoir means connected to the body and including a chamber containing a fluid, port means between the charge chamber and reservoir means, valve means carried by the body and controlling flow through said port means to control communication between the reservoir chamber and charge chamber, and second valve means connected to the reservoir means for charging and retaining in said reservoir chamber a fluid at an elevated pressure while the reservoir chamber is at the surface of the earth said second valve means including a valve seat and a second valve member cooperable with said valve seat and exposed to pressure within and without said reservoir, said second valve means moved to open position when ambient pressure exceeds said reservoir and operable to permit fluid pressure in a well to be exerted on the interior of the charge chamber upon disposing the same at a substantial depth in a well.

15. The valve of claim 14 wherein said second valve member is openable and closable to control flow between the interior and the exterior of both the reservoir chamber and charge chamber, and said second valve means including a third valve for charging the reservoir chamber while the first valve is closed.

16. A valve comprising, a valve seat, a first valve member cooperable with the seat to control flow therethrough, charge-chamber means including first pressure-responsive means, said first pressure-responsive means connected to and controlling movement of said first valve member, a port communicating between the interior and exterior of said charge chamber means, a second valve member controlling flow through said port, second pressure-responsive means providing a portion of said charge chamber means and connected to said second valve member, said second pressure-responsive means exposed on one side to pressure fluid exteriorly of said charge-chamber means, said second pressure-responsive means actuating said second valve member for opening and closing said port responsive to differential pressure between said charge-chamber means pressure and said exterior fluid pressure in which charge-chamber pressure is higher than exterior fluid pressure, first resilient means urging the second valve member toward closed position, a second port communicating between the interior and exterior of said charge-chamber means, a third valve member controlling flow through said second port, third pressure-responsive means providing a portion of said charge-chamber means and connected to said third valve member, said third pressure-responsive means exposed on one side to pressure fluid exteriorly of said charge-chamber means, said third pressure-responsive means actuating said third valve member for opening and closing said second port responsive to differential pressure between said charge-chamber means pressure and said exterior fluid pressure in which charge-chamber pressure is lower than exterior fluid pressure, second resilient means urging the third valve member toward closed position, a reservoir charged with fluid under pressure for supplying pressure fluid to the charge chamber, and valve means controlling flow of fluid into and out of said reservoir including a fourth valve member held in seated position against a valve seat by said reservoir pressure, said fourth valve member moving to open position when the forces acting on said fourth valve member are unbalanced in a direction tending to move the fourth valve member to open position and being free to remain in open position.

References Cited in the file of this patent

UNITED STATES PATENTS

| | | |
|---|---|---|
| 1,639,004 | Riley et al. | Aug. 16, 1927 |
| 1,886,009 | Griswold | Nov. 1, 1932 |
| 2,033,563 | Wells | Mar. 10, 1936 |
| 2,043,798 | Hyatt | June 9, 1936 |
| 2,251,244 | Stanley | July 29, 1941 |
| 2,342,301 | Peters | Feb. 22, 1944 |
| 2,351,322 | Crake | June 13, 1944 |
| 2,385,316 | Walton | Sept. 18, 1945 |
| 2,465,060 | Carlisle et al. | Mar. 22, 1949 |
| 2,509,839 | Panner | May 30, 1950 |
| 2,519,242 | Garrett et al. | Aug. 15, 1950 |
| 2,642,811 | Fletcher | June 23, 1953 |
| 2,642,889 | Cummings | June 23, 1953 |
| 2,657,895 | Huber et al. | Nov. 3, 1953 |
| 2,680,408 | Davis | June 8, 1954 |
| 2,709,445 | Garrett et al. | May 31, 1955 |
| 2,790,395 | Garrett et al. | Apr. 30, 1957 |
| 2,804,830 | Garrett et al. | Sept. 3, 1957 |
| 2,880,758 | Mercier | Apr. 7, 1959 |